United States Patent
Xu et al.

(10) Patent No.: US 11,044,645 B2
(45) Date of Patent: Jun. 22, 2021

(54) SIDELINK-ASSISTED HANDOVER IN CELLULAR NETWORKS

(71) Applicant: Huawei Technologies Duesseldorf GmbH, Duesseldorf (DE)

(72) Inventors: Wen Xu, Munich (DE); Konstantinos Manolakis, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/364,815

(22) Filed: Mar. 26, 2019

(65) Prior Publication Data

US 2019/0223066 A1 Jul. 18, 2019

Related U.S. Application Data

(63) Continuation of application No. PCT/EP2016/073342, filed on Sep. 29, 2016.

(51) Int. Cl.
*H04W 36/00* (2009.01)
*H04J 3/06* (2006.01)
(Continued)

(52) U.S. Cl.
CPC ... *H04W 36/0058* (2018.08); *H04W 36/0072* (2013.01); *H04W 36/08* (2013.01); *H04W 88/04* (2013.01); *H04W 92/18* (2013.01)

(58) Field of Classification Search
CPC ............ H04W 36/0058; H04W 36/08; H04W 36/0072; H04W 92/18; H04W 88/04
(Continued)

(56) References Cited

U.S. PATENT DOCUMENTS

2004/0228304 A1* 11/2004 Riedel ................ H04W 36/26
370/332
2006/0252416 A1* 11/2006 Du ........................ H04L 45/00
455/422.1
(Continued)

FOREIGN PATENT DOCUMENTS

CN 102422703 A 4/2012
CN 103906127 A 7/2014
(Continued)

OTHER PUBLICATIONS

Orsino et al., "Assisted Handover Based on Device-to-Device Communications in 3GPP LTE Systems," IEEE Globecom Workshops, San Diego, USA, pp. 1-6, Institute of Electrical and Electronics Engineers—New York, New York (Dec. 2015).
(Continued)

*Primary Examiner* — Mark G. Pannell
(74) *Attorney, Agent, or Firm* — Leydig, Voit & Mayer, Ltd.

(57) ABSTRACT

A first user equipment (UE) comprising a processor adapted to execute the following operations to assist a handover of a second UE from a source network apparatus to a target network apparatus: maintain a sidelink connection with the second UE, maintain and/or establish a cellular connection, in particular with the target network apparatus, report to the target network apparatus a link state information, based on the link state information received from the second UE through the sidelink connection, receive from the target network apparatus a first control information calculated based on the link state information and send to the second UE through the sidelink connection a second control information, based on the first control information, to assist the handover of the second UE to the target network apparatus.

13 Claims, 15 Drawing Sheets

(51) Int. Cl.
*H04W 4/00* (2018.01)
*H04W 36/08* (2009.01)
H04W 88/04 (2009.01)
H04W 92/18 (2009.01)

(58) Field of Classification Search
USPC .......................................................... 455/436
See application file for complete search history.

(56) References Cited

U.S. PATENT DOCUMENTS

| | | | | |
|---|---|---|---|---|
| 2007/0026792 | A1* | 2/2007 | Korneluk | G01S 19/03 455/10 |
| 2012/0163283 | A1* | 6/2012 | Kim | H04W 88/10 370/315 |
| 2013/0077512 | A1* | 3/2013 | Chang | H04W 56/001 370/252 |
| 2013/0083722 | A1* | 4/2013 | Bhargava | H04W 48/20 370/315 |
| 2014/0204814 | A1* | 7/2014 | Ahmadvand | H04W 52/02 370/311 |
| 2015/0045033 | A1 | 2/2015 | Kim et al. | |
| 2015/0087322 | A1* | 3/2015 | Maguire | H04W 76/19 455/450 |
| 2015/0146687 | A1* | 5/2015 | Kim | H04W 76/14 370/331 |
| 2015/0230166 | A1* | 8/2015 | Casati | H04W 36/12 370/328 |
| 2016/0011824 | A1* | 1/2016 | Ishimura | G06F 3/1236 358/1.15 |
| 2016/0066361 | A1* | 3/2016 | Ogawa | H04W 72/0453 370/315 |
| 2016/0100441 | A1 | 4/2016 | Li et al. | |
| 2016/0212682 | A1 | 7/2016 | Chung et al. | |
| 2017/0013575 | A1* | 1/2017 | Jung | H04W 56/002 |
| 2017/0019833 | A1* | 1/2017 | Luo | H04W 40/24 |
| 2018/0309561 | A1* | 10/2018 | Nozawa | H04W 16/28 |
| 2019/0149974 | A1* | 5/2019 | Gazdziak | H04W 4/02 |

FOREIGN PATENT DOCUMENTS

| | | |
|---|---|---|
| CN | 104620661 A | 5/2015 |
| CN | 104770048 A | 7/2015 |
| CN | 104918299 A | 9/2015 |
| CN | 105210410 A | 12/2015 |
| CN | 105636235 A | 6/2016 |
| EP | 2753122 A2 | 7/2014 |
| WO | 2011109027 A1 | 9/2011 |
| WO | 2014173443 A1 | 10/2014 |
| WO | 2016021943 A1 | 2/2016 |
| WO | 2016116289 A1 | 7/2016 |

OTHER PUBLICATIONS

Chen et al, "Handover Mechanism for Device-to-Device Communication," 2015 IEEE Conference on Standards for Communications and Networking (CSCN), IEEE, pp. 72-77, XP03285610, Institute of Electrical and Electronics Engineers—New York, New York (Oct. 28, 2015).

Yilmaz et al, "Smart Mobility Management for D2D Communications in 5G Networks," XP055143347, pp. 1-6, Nokia Research Center (Sep. 1, 2014).

* cited by examiner

SIDELINK-ASSISTED HANDOVER IN CELLULAR NETWORKS

CROSS-REFERENCE TO RELATED APPLICATIONS

This application is a continuation of International Application No. PCT/EP2016/073342, filed on Sep. 29, 2016, the disclosure of which is hereby incorporated by reference in its entirety.

BACKGROUND

The present disclosure, in some embodiments thereof, relates to assisting a handover of a user equipment (UE) between networks infrastructure apparatuses and, more specifically, but not exclusively, to assisting a handover of one or more UEs between networks apparatuses using a sidelink between the UE(s) and one or more other UEs.

One of the key technologies introduced by future wireless networks, and in particular cellular networks such as, for example, 5G ($5^{th}$ generation) cellular networks, is a capability of the UEs to simultaneously maintain a cellular connection and one or more direct device-to-device (D2D) connections for communicating with other UE(s).

The D2D communication may be utilized by a sidelink channel through which the UEs may communicate with one another. The sidelink may be in-band, i.e. share the same frequency band(s) and/or carrier(s) as the cellular network and/or out-of-band, i.e. assigned with frequency band(s) and/or carrier(s) that are not used by the cellular link.

The D2D communication may serve a plurality of existing and/or future applications and may address the need to support connectivity and access for the growing multitude of high mobility UEs, for example, vehicular users and/or network enabled vehicles such as V2V (vehicle to vehicle communication) and/or V2X vehicle to anything communication) capable vehicles.

SUMMARY

According to an aspect of some embodiments of the present invention there is provided a first user equipment, UE, apparatus comprising a processor adapted to execute the following operations to assist a handover of a second UE from a source network apparatus to a target network apparatus:

Maintain a sidelink connection with the second UE.
Maintain and/or establish a cellular connection, in particular with the target network apparatus.
Report to the target network apparatus a link state information, based on the link state information received from the second UE through the sidelink connection;
Receive from the target network apparatus a first control information calculated based on the link state information.
Send to the second UE through the sidelink connection a second control information, based on the first control information, to assist the handover of the second UE to the target network apparatus.

The processor is further adapted to configure the first UE to serve as a relay to provide an uplink and/or a downlink to the second UE through the sidelink connection while the second UE is detached from any of the network apparatuses.

The first control information and/or the second control information include one or more of: a timing synchronization information and a connectivity information. Wherein the link state information indicates a status of a cellular link of the UE and includes one or more of: a channel measurements, a connectivity information and/or a timing synchronization information.

Optionally, in case the first UE is attached to the source network apparatus, the processor is adapted to detach from the source network apparatus prior to attaching to the target network apparatus.

In case the second UE is attached to the source network apparatus, the processor is adapted to maintain the sidelink connection with the second UE while the second UE detaches from the source network apparatus in order to attach to the target network apparatus.

Optionally, the processor is adapted to maintain the sidelink connection by disconnecting and reconnecting the sidelink connection with the second UE using the first control information and/or the second control information.

Optionally, the processor is adapted to maintain the connection with the second UE through the sidelink connection with at least a third UE. The at least third UE is connected to the second UE through the sidelink connection.

According to an aspect of some embodiments of the present invention there is provided a UE attached to a cellular network through a source network apparatus comprising a processor adapted to execute the following operations to assist a first UE to attach to a target network apparatus:

Maintain a sidelink connection with the first UE.
Maintain and/or establish a cellular connection, in particular with the source network apparatus.
Report to the source network apparatus a link state information, based on the link state information received from the first UE through the sidelink connection.
Receive from the source network apparatus a first control information calculated based on the link state information.
Send to the first UE through the sidelink connection a second control information, based on the first control information, to assist an attachment of the first UE to the target network apparatus.

Optionally, the processor is adapted to configure the second UE to serve as a relay to provide an uplink and/or a downlink to the first UE through the sidelink connection while the first UE is detached from any of the network apparatuses.

In case the first UE is attached to a source network apparatus, the first UE detaches from the source network apparatus in order to attach to the target network apparatus.

Optionally, the processor is adapted to assist the attachment of the first UE to the source network apparatus after the first UE temporarily detaches from the source network apparatus.

Optionally, the processor is adapted to maintain the connection with the first UE through the sidelink connection with at least a third UE. The at least third UE is connected to the second UE through the sidelink connection.

According to an aspect of some embodiments of the present invention there is provided a network apparatus of a cellular network, comprising a processor adapted to:

Provide a cellular service to an attached assisting UE connected through a sidelink connection to an assisted UE.
Receive, from the assisting UE, a link state information, based on the link state information of the assisted UE transmitted by the assisted UE to the assisting UE through the sidelink connection.

Transmit to the assisting UE a first control information calculated based on the link state information.

Receive an attach request from the assisted UE to attach using a second control information received by the assisted UE from the assisting UE through the sidelink connection, the second control information is based on the first control information.

Accept the attach request of the assisted UE to provide the cellular service to the assisted UE.

Optionally, in case the assisted UE is attached to another network apparatus, the processor is further adapted to negotiate with the other network apparatus a handover of the assisted UE in order to instruct the assisted UE to detach from the other network apparatus while maintaining the sidelink connection with the assisting UE.

According to an aspect of some embodiments of the present invention there is provided a method of assisting a handover of an assisted UE from one network apparatus to another network apparatus, comprising:

Providing, by a network apparatus, a cellular service to an attached assisting UE, the assisting UE is connected through a sidelink connection to an assisted UE;

Receiving from the assisting UE, a link state information, based on the link state information of the assisted UE transmitted by the assisted UE to the assisting UE through the sidelink connection.

Transmitting to the assisting UE a first control information calculated based on the link state information.

Receiving an attach request from the assisted UE to attach to the network apparatus using a second control information received by the assisted UE from the assisting UE, the attach request is forwarded by the assisting UE from the assisted UE to the network apparatus, the second control information is based on the first control information.

Attaching the assisted UE to the network apparatus to provide the cellular service to the assisted UE.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
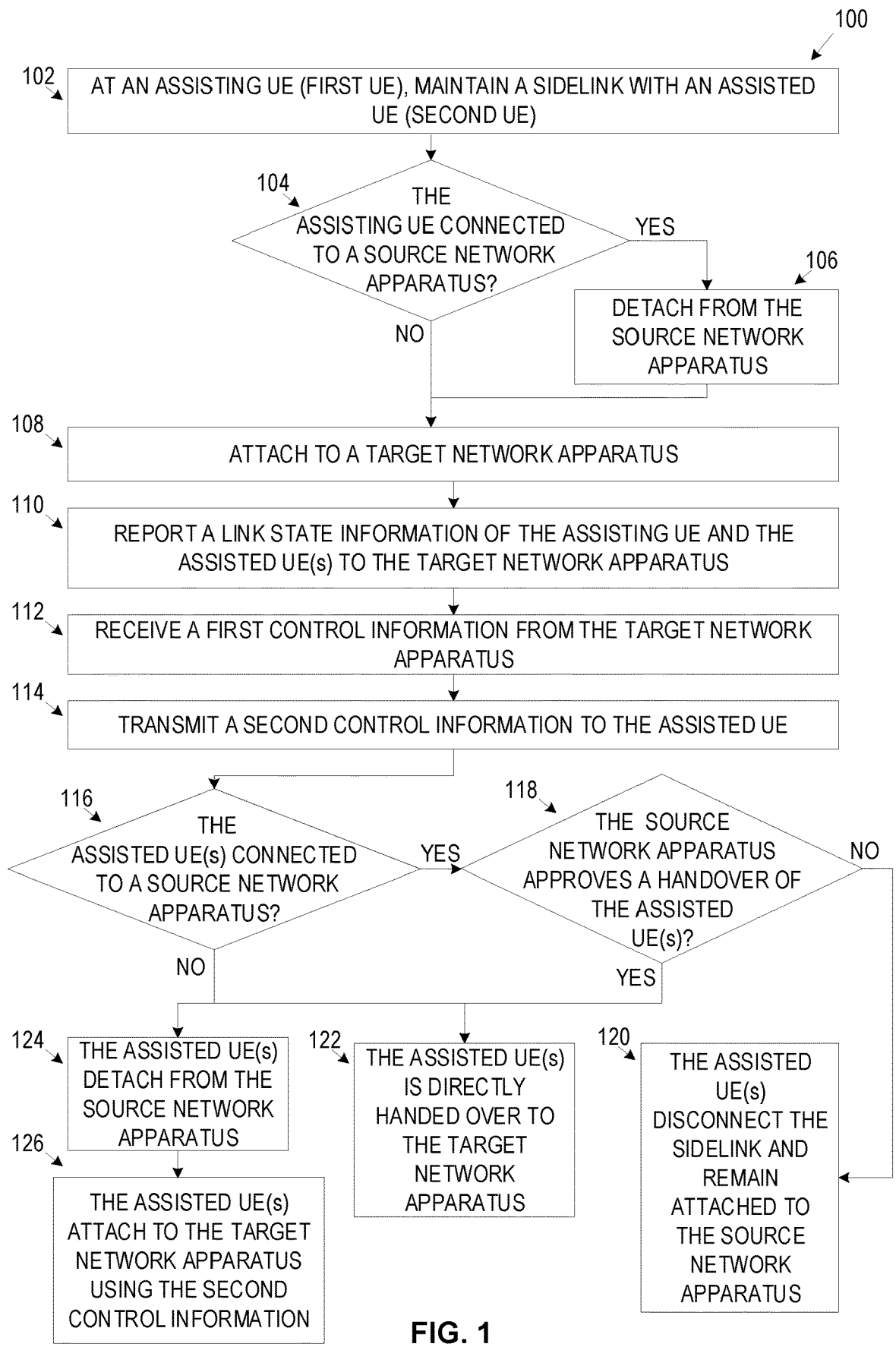
FIG. 1 is a flowchart of an exemplary process for assisting a handover of a UE between network apparatuses using a sidelink between the UE and at least one other UE, according to some embodiments of the present invention.

The present disclosure, in some embodiments thereof, relates to assisting a handover of a user equipment (UE) between networks infrastructure apparatuses and, more specifically, but not exclusively, to assisting a handover of one or more UEs between networks apparatuses using a sidelink between the UE(s) and one or more other UEs.

The present disclosure presents systems and methods for handing over one or more UEs, for example, a cellular phone, a cellular apparatus, a mobile device, a vehicular cellular user, an endpoint and/or the like from a source network apparatus to a target network apparatus with assistance of one or more UEs communicating with the handed over UE(s) over a sidelink channel. The assisted handover is directed towards providing an ultra-reliable low-latency communication (URLLC) for the UEs connected to a wireless network, in particular a cellular network, for example, a 5G ($5^{th}$ generation) cellular network and/or the like. The network apparatus may be, for example, a node B, an evolved Node B (eNB), a base station, a radio network controller (RNC) and/or the like. The assisting UE that is attached to an attached network apparatus, for example, the source network apparatus or the target network apparatus assists the handover by relaying information between the attached network apparatus and the (assisted) handed over UE(s) through the sidelink channel, for example, D2D communication supported by, for example, the 5G cellular network. The assisting UE may receive link state information from the assisted UE(s), for example, channel measurements information and/or connectivity state information and may relay it to the attached network apparatus. The link state information may indicate and/or relate to among other indications, a quality and/or strength of the cellular signal and may include, for example, a signal arrival/departure time and/or angle, timing difference between two signals, a reference signal received power (RSRP), a reference signal received quality (RSRQ) and other measurement related to the cellular channel. The link state information of the assisted UE may assist the attached network apparatus to identify connectivity condition(s) of the assisted UE(s) to determine if and/or when the assisted UE(s) may be handed over. The assisting UE may further relay timing and/or control information from the attached network apparatus to the assisted UE. The timing information may include, for example, timing advance (TA), an offset from a time base provided by for example, a global positioning system (GPS), a global navigation satellite system (GNSS), a coordinated universal time (UTC) and/or the like. This may allow the assisted UE(s) to synchronize to the timing provided by the target network apparatus even before the assisted UE(s) are actually attached to the target network apparatus. The assisting UE may be further adapted to relay uplink and/or downlink data from the attached network apparatus to one or more of the assisted UE(s) while the assisted UE(s) are not attached to any network apparatus, for example, the assisted UE(s) are out of coverage.

The assisted handover may present significant advantages. One of the major problems inherent to the cellular network(s) is a latency problem during the handover of the UE(s) from the source network apparatus to the target network apparatus. Prior to the handover process, the migrating UE(s) that need to be handed over are synchronized according to timing synchronization information provided by the source network apparatus. However, during the handover the handed over UE(s) may need to synchronize according to the timing synchronization information provided by the target network apparatus. This may be required since typically the network apparatuses, for example, the source and the target network apparatuses are not synchronized with each other in a cellular networks using frequency division duplex (FDD), even for network apparatuses serving adjacent cells (coverage areas). Timing synchronization may be essential to avoid timing synchronization and coexistence problems that may result from the fact that the cellular connection for the uplink/downlink and the sidelink may need to coexist while sharing the same frequency band(s) and/or carrier(s) (in-band). For example, a cellular network using orthogonal frequency division multiplexing (OFDM) waveforms may suffer from inter-symbol interference (ISI) if time offsets of signals transmitted from the UE to the receiving network infrastructure apparatus exceed a predefined threshold level that may typically be duration of the cyclic prefix (CP). This may result from signals overlapping "over the air" and, even if the individual times of arrival may be detected, the signals cannot be processed separately. At the same time, these misalignments cause inter-carrier interference (ICI), as the circular convolution properties between signal and channel are affected in such way that subcarriers' orthogonality and/or other alignment of the subcarriers' is violated.

During the handover sequence, a significant amount of control, timing and/or signaling information may need to be exchanged between the source network apparatus and the target network apparatus in order to provide cellular service to UE, for example, assign a TA index, assign cellular resources and/or the like. The information exchange may introduce significant delays. Moreover, during the handover, the timing information that needs to be provided to the handed over UE(s) that may lead to additional delays. This may result in unacceptable latency, interruptions and/or failures of the cellular service provided to the handed over UE(s). This may significantly affect the serviceability of the cellular network and make it inappropriate to serve URLLC applications, for example, safety applications, emergency applications and/or the like.

The assisted handover using the sidelink may expedite the handover process by allowing the handed over UE(s) to adapt early to the timing of the target network apparatus. As the assisting UE(s) is attached to the network apparatus, either the target or the source network apparatus, the assisting UE(s) may forward the timing synchronization information from the attached network apparatus to the handed over UE(s). The handed over UE(s) may therefore adopt the timing of the target network apparatus even before they request to attach and once instructed to attach and/or sensing a significant cellular signal from the target network apparatus may rapidly attach to it. Through the early adoption of the timing provided by the target network apparatus by the handed over UE(s), the cellular sidelink D2D communication may become highly preferable for URLLC applications. With the handed over UE synchronizing to the timing of the target network apparatus prior to the actual handover and/or attachment, the latency involved with the handover may be significantly reduced to meet the quality of Service (QoS) and/or URLLC requirements of the URLLC applications.

Additionally, the assisting UE(s) may convey the link state information of the out of coverage assisted UE(s) to the attached network apparatus. The attached network apparatus may then decide, based on the conveyed link state information, when and whether to initiate the detachment, the handover and/or the attachment of the handed over UE(s).

Moreover, while the handed over UE(s) are out of coverage and/or are not served by any of the network apparatuses, they may remain synchronized with the timing information originating from the attached network apparatus that is received through the assisting UE(s). This may allow the out of coverage handed over UE(s) to rapidly attach and/or reconnect to the attached network apparatus.

Another problem of the cellular network(s), in particular during the handover, is the loss of service after the migrating UE(s) detach from the source network apparatus and before they attach to the target network apparatus.

The assisted handover may significantly reduce the impact of this problem and possibly overcome it all together since while the handed over UE(s) are not attached to any of the network apparatuses they may still be served with the uplink and/or downlink connection relayed through the assisting UE(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer such as the user equipment (UE), as a stand-alone software package, partly on the user's computer and partly on a remote computer such as the network apparatus or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to some embodiments of the present invention, there are presented systems and methods for assisting a handover of one or more UEs between a source network apparatus and a target network apparatus using a sidelink connecting the UEs. The assisted handover may typically be directed towards assisting the handover of a plurality of UEs migrating from a source coverage area serviced by the source network apparatus to a target coverage area serviced by the target network apparatus. Furthermore, the UEs may be migrating gradually from one coverage area to the other, for example, one or more of the UEs (a first UEs) may leave the source coverage area earlier than a one or more other UEs (a second UEs), the first UE(s) may enter the target coverage area earlier than the second UE(s) and/or the like.

The assisted handover may be applied for a plurality of UEs and/or network apparatuses deployment scenarios, some of which are described hereinafter. However, the presented embodiments should not be construed as limiting since the assisted handover may apply for a plurality of other deployment scenarios. Moreover, the assisted handover procedure presented herein may be executed for assisting the assisted UE(s) during only part of the handover process, for example, the attach phase and/or the detach phase.

In some embodiments of the present invention, during the assisted handover, the UEs may switch roles. One or more of the UEs may perform as an assisting UE(s) to assist the assisted UE(s) during one or more phases of the handover, for example, the detach phase and/or the detach phase and may become the assisted UE(s) during another phase of the handover. The same may happen also in the other direction, in which one or more UEs that are assisted UE(s) during one or more phases of the handover phases may become the assisting UE(s) during other phase(s) of the handover.

According to some embodiments there are presented two main modes of assisted handover of one or more UEs between a source network apparatus and a target network apparatus. In the first mode, the handover may be initiated by one or more of the UEs while in the second mode the handover may be initiated by a network apparatus.

Reference is now made to FIG. 1, which is a flowchart of an exemplary process for assisting a handover of a UE between network apparatuses using a sidelink between the UE and at least one other UE, according to some embodiments of the present invention. A process 100 may be executed by one or more assisting UEs, for example, the first UE to assist a handover of one or more assisted UEs, for example, the second UE from a source network apparatus to a target network apparatus, both network apparatuses providing connectivity to a wireless network, in particular a cellular network. In particular, the process 100 may be applied by the first UE(s) once attached to the target network apparatus, to assist the second UE(s) to attach to the target network apparatus while the second UE migrates from the source coverage area to the target coverage area. For some deployment scenarios of the UEs 204 all steps of the process 100 while for other deployment scenarios some steps may not be applicable as described herein after.

For brevity, the process 100 is described for one assisting UE assisting the handover of one assisted UE. The process 100 however may be extended to assist the handover of a plurality of additional assisted UEs.

The first UE performing as the assisting UE may attach to the target network apparatus while maintaining a sidelink communication channel with the second UE that is the assisted UE throughout the entire handover process. The sidelink is a communication channel through which the UEs communicate with each other such as, for example, D2D communication. The first UE assists the second UE during the handover by forwarding information from the target network apparatus to the second UE and vice versa. The first UE may forward, for example, timing synchronization information and/or control information transmitted from the target network apparatus to the second UE. In the other direction, the first UE may collect, for example, link state information from the second UE and report the link state information to the target network apparatus. The timing synchronization information may include, for example, TA, an offset from a time base provided by, for example, a GPS, a GNSS, a UTC and/or the like. The control information may include, for example, instructions issued by the network apparatus to the UE(s), for example, sidelink maintain/discard, initiate attachment, initiate detachment and/or the like. The link state information may include, for example, channel measurement(s) that may indicate among other indications, a quality and/or strength of the cellular signal and may include, for example, a signal arrival/departure time and/or angle, a timing difference between two signals, an RSRP, an RSRQ and other measurement related to the cellular channel. The link state information may further include connectivity indications of the respective UE, for example, attach/detach information with respect to a respective network apparatus, quality of service (QoS) and/or the like. The first UE that periodically reports its link state information to the target network apparatuses may include the link state information received from the second UE to the reported information.

Through the information forwarded back and forth between the target network apparatus and the second UE, the target network apparatus may be aware of the link state of the second UE and the second UE may be exposed to the timing synchronization and/or control information provided by the target network apparatus. The availability of the link state information from the second UE combined with the early adoption of the target network apparatus timing by the second UE prior to the attachment may lead to a rapid, smooth and/or efficient handover.

Reference is also made to FIG. 2A through FIG. 2F, which are schematic illustrations of an exemplary sequence of a sidelink-assisted handover of a UE between network apparatuses, according to some embodiments of the present invention. Depending on the various deployment scenarios, some phases of the presented sequence may occur during the assisted handover while other phase may not take place as is described herein after. The wireless network is provided by a universal terrestrial radio access network (UTRAN) comprising a plurality of network apparatuses, for example, a node B, an evolved Node B (eNB), a base station, a radio network controller (RNC) and/or the like connecting to a core of the wireless network. The UTRAN may further include one or more of a plurality of other network infrastructure elements, for example, Mobility Management Entities (MME), Serving Gateways (SGW) and/or the like. Typically, the network infrastructure apparatuses are not synchronized with each other, i.e. they may have different timing with respect to each other. However, there may be scenarios when two or more of the network infrastructure apparatuses have a common time base.

Two network apparatuses 202A and 202B each provide coverage for the wireless network in coverage areas 212A and 212B respectively. The network apparatus 202A is designated herein after as a source network apparatus 202A while the network apparatus 202B is designated herein after as a target network apparatus 202B. A plurality of UEs 204, in particular a first UE, UE 204A, and a second UE, UE 204B, may connect to the cellular network through an uplink and/or downlink cellular connections to the network apparatuses 202A or 202B when located within the coverage area 212A and 212B respectively. Each of the UEs 204 may be, for example, a cellular phone, a cellular apparatus, a mobile device, an endpoint, a vehicular cellular user, a network enabled vehicle (V2X and/or V2V capable vehicle) and/or the like.

The UEs 204 are D2D enabled allowing each of the UEs 204 to communicate directly with one or more of the other UEs 204 over the sidelink channel (referred to as sidelink herein after). The sidelink may be utilized in-band with respect to the cellular connection, i.e. the sidelink communication occupies a frequency band(s) and/or carrier(s) used by the cellular connection, typically the uplink connection. Optionally, the sidelink is out-of-band with respect to the cellular connection, i.e. the sidelink communication is conducted in a frequency band(s) and/or carrier(s) not used by the cellular connection.

As shown at 102, the UE 204A (the first UE) that is the assisting UE maintains a sidelink with the UE 204B (the second UE) that is the assisted UE. Maintaining the sidelink between the UE 204A and the UE 204B may require setting up the sidelink by connecting and/or reconnecting the sidelink during the assisted handover process 100. However, through the entire process 100 the UE 204A continuously maintains the sidelink with the UE 204B such that the UE 204A and UE 204B may communicate with each other throughout the process 100 as shown in FIG. 2A through FIG. 2E.

Figure 2A:
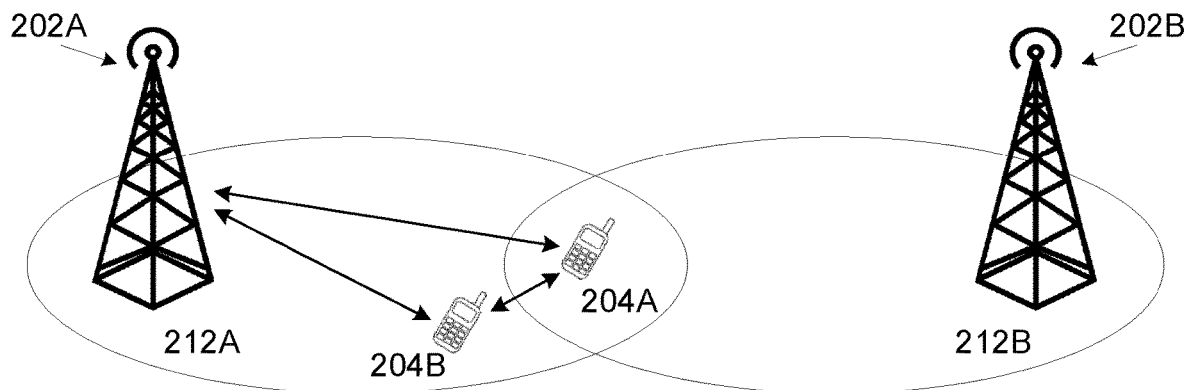
FIG. 2A through FIG. 2F are schematic illustrations of an exemplary sequence of a sidelink-assisted handover of a UE between network apparatuses, according to some embodiments of the present invention.

In some embodiment of the present invention, the UE 204A is initially attached to the source network apparatus 202A as shown in FIG. 2A. In the deployment scenario shown in FIG. 2A, the UE 204A and the UE 204B may maintain the sidelink since they are both connected to the source network apparatus 202A, and receive their timing information, for example, the TA from the source network apparatus 202A. The UE 204A and the UE 204B are therefore timing synchronized with each other and may maintain the sidelink (in particular the in-band sidelink) with each other simultaneously with their cellular connection to the source network apparatus 202A as shown in FIG. 2A.

In some embodiments of the present invention, the UE 204A is not attached to any network apparatus 202, for example, the UE 204A is out of coverage. However, while the UE 204A is out of coverage, the 204A maintains the sidelink with the UE 204B either directly or through one or more intermediate UEs 204. The intermediate UEs 204 may form a chain for connecting the UE 240A with the UE 204B.

Figure 3A:
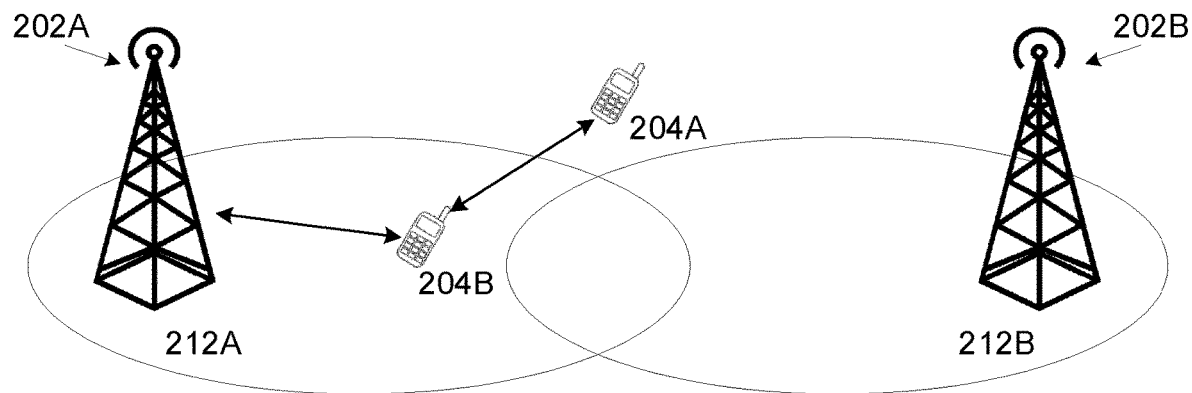
FIG. 3A and FIG. 3B are schematic illustrations of an exemplary sidelink-assisted handover, in particular during an attach phase for an out of coverage assisting UE, according to some embodiments of the present invention.
Figure 3B:
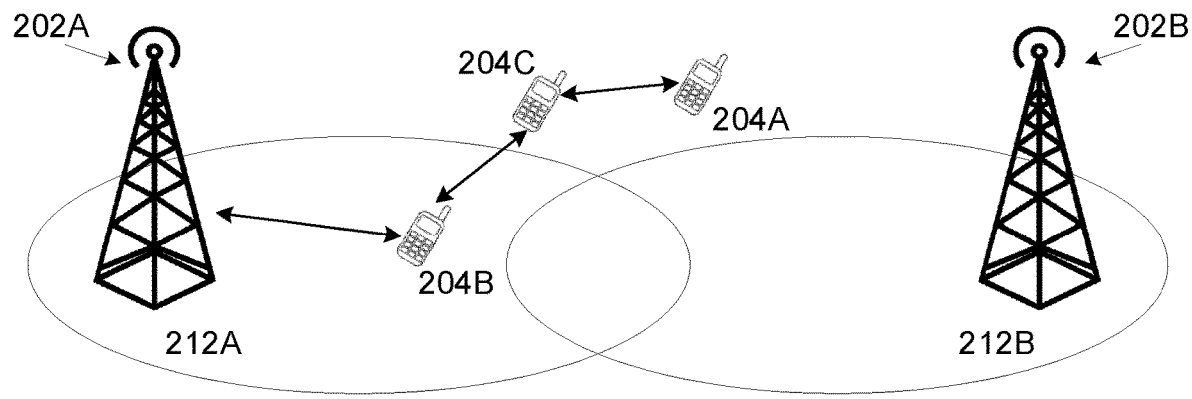

Reference is now made to FIG. 3A and FIG. 3B, which are schematic illustrations of an exemplary sidelink-assisted handover, in particular during an attach phase for an out of coverage assisting UE, according to some embodiments of the present invention. An assisting UE such as the UE 204A is out of coverage, i.e. not connected to any network apparatus such as the network apparatus 202, in particular, the UE 204A is not connected to either one of the source network apparatus 202A and the network apparatus 202B. The UE 204A maintains a sidelink with the UE 204B that may be connected to the source network apparatus 202A as shown in FIG. 3A. Optionally, the UE 204A may maintain the sidelink with the UE 204B through one or more intermediate UEs 204, for example, a UE 204C that maintains the sidelink with both the UE 204A and the UE 204B as shown in FIG. 3B. The UE 204C may forward messages such as, for example, link state information, uplink data and/or the like from the UE 204A to the UE 204B and vice versa, i.e. timing/control information, downlink data and/or the like originating from the source network apparatus 202A and relayed through the UE 204B.

The UE 204A and the UE 204B may maintain the sidelink since the UE 204A is out of coverage and receives its timing synchronization information from the UE 204B that in turn receives the timing synchronization information from the source network apparatus 202A. Since both the UE 204A and the UE 204B use timing synchronization information, for example, the TA originating from the source network apparatus 202A, the UE 204A and the UE 204B are timing synchronized with each other. This allows the UE 204B to maintain the sidelink (in particular the in-band sidelink) with the UE 204A simultaneously with its cellular connection to the source network apparatus 202A as shown in FIG. 3A. The same applies to the deployment scenario shown in FIG. 3B where both the UE 204A and the UE 204C are out of coverage and use timing synchronization information originating from the source network apparatus 202A received through the UE 204B.

As the UE 204B is still attached to the source network apparatus 202A as shown in FIG. 3A and/or FIG. 3B, based on instructions received from the source network apparatus 202A, the UE 204B may serve as a relay for the UE 204A while the UE 204A is out of coverage. As a relay the UE 204B may convey the link state information from the UE 204A to the source network apparatus 202A. In the other direction, as discussed before, the UE 204B may forward the timing synchronization and/or control information from the source network apparatus 202A to the UE 204A. Assuming the source network apparatus 202A has sufficient cellular resources to serve the UE 204A, the UE 204B may be instructed by the source network apparatus 202A to further perform as the relay to transfer uplink and/or downlink data between the source network apparatus 202A and the UE 204A. The same applies in case the UE 204A is connected to the UE 204B through the intermediate UE(s) 204, for example, the UE 204C that performs as a relay between the UE 204A and the UE 204B.

Reference is made once again to FIG. 1.

As shown at 104, which is a decision point, the UE 204A may take different steps depending on its cellular connectivity state. In case the UE 204A is attached to the source network apparatus 202A as shown in FIG. 2A, the process 100 branches to 106. In case the UE 204A is not attached to the source network apparatus 202A, for example, the UE 204A is out of coverage as shown in FIG. 3A and/or FIG. 3B, the process 100 branches to 108.

Figure 2B:
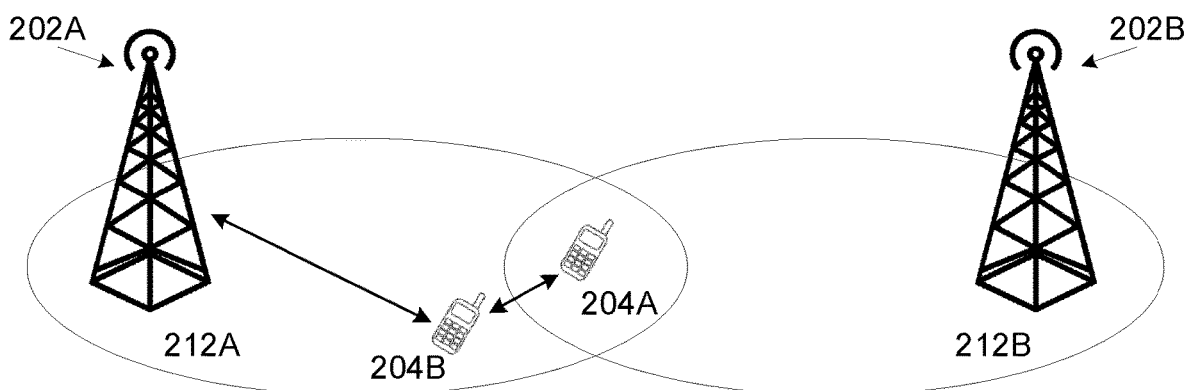

As shown at 106, the UE 204A detaches from the source network apparatus 202A i.e. disconnects the cellular connection with the source network apparatus 202A as shown in FIG. 2B. The detachment of the UE 204A from the source network apparatus 202A may be initiated by the UE204A and/or by the source network apparatus 202A. The UE 204A may request to detach due to, for example, a low signal of the cellular connection, for example, in case a signal interference plus noise ratio (SINR) is below a predefined threshold level. Alternatively and/or additionally, the UE 204A may detach automatically without requesting the source network apparatus 202A to detach, for example, in case the SINR is below the predefined threshold level. The UE 204A may further initiate the detachment in case it detects one or more other network apparatuses, in particular the target network apparatus 202B presenting a better cellular connection signal, for example, a better SINR and/or the like. In case the detachment is initiated by the source network apparatus 202A the detachment instruction to the UE 204A may result from, for example, a poor cellular connection to the UE 204A and/or cellular resource(s) are unavailable at the source network apparatus 202A for serving the UE 204A. The source network apparatus 202A may also initiate the detachment following negotiations with one or more other network apparatuses, in particular the target network apparatus 202B that picks up the cellular signal from the UE 204A. The poor cellular signal may result from, for example, the UE204A moves out of the coverage area 212A as shown in FIG. 2B. Complementary, the detection of a cellular signal from the target network apparatus 202B may result from, for example, the UE 204A advancing into the coverage area 212B as shown in FIG. 2B.

The UE 204A maintains the sidelink such that the UE 204A remains connected to the UE 204B during and following the detachment from the source network apparatus 202A.

The UE 204B is still attached (connected) to the source network apparatus 202A as shown in FIG. 2B. Based on instructions received from the source network apparatus 202A, the UE 204B may serve as a relay for the UE 204A while the UE 204A is detached from any network apparatus 202, in particular, the source network apparatus 202A and the target network apparatus 202B. As a relay the UE 204B may convey the link state information from the UE 204A to the source network apparatus 202A. In the other direction, the UE 204B may forward the timing synchronization and/or control information from the source network infrastructure apparatus 202A to the UE 204A. Assuming the source network apparatus 202A has sufficient cellular resources to serve the UE 204A, the UE 204B may be instructed by the network apparatus 202A to further perform as the relay UE 204B to transfer uplink and/or downlink data between the source network apparatus 202A and the UE 204A. Naturally, the UE 204B may serve as a relay only while the UE 204B is in the coverage area 212A and connected to the source network apparatus 202A.

Figure 2C:
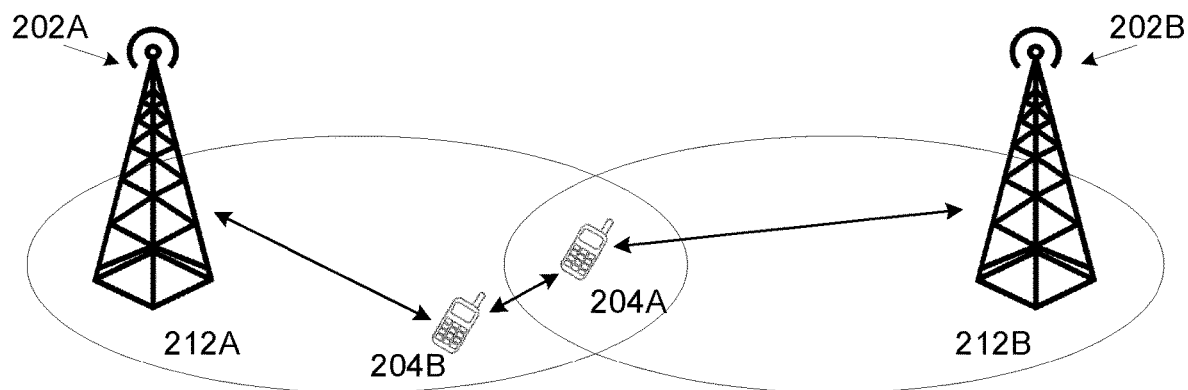

A shown at 108, the UE 204A attaches, i.e. establishes a cellular connection to the target network apparatus 202B by requesting to attach, to the target network apparatus 202B when detecting a sufficient cellular signal from the target network apparatus 202B, for example, when entering the coverage area 212B as shown in FIG. 2C.

As shown at 110, the UE 204A reports to the target network apparatus 202B the link state information received from the UE 204B through the sidelink such that the target network apparatus is made aware of the presence of the UE 204B and its link state information. The UE 204A may forward the link state information of the UE 204B to the target network apparatus 202B while reporting its own link state information, e.g. periodically, as part of the cellular communication protocol.

Based on the reported link state information of the UE 204B, the target network apparatus 202B may evaluate one or more actions that may be taken with respect to the UE 204B, for example, evaluating a handover of the UE 204B to the target network apparatus 202B and/or the like. Optionally, in case the UE 204B is attached to the source network apparatus 202A, the target network apparatus 202B may initiate a negotiation session with the source network apparatus 202A as part of the evaluation. The evaluation made by the target network apparatus 202B may consider availability of cellular resources of the target network apparatus 202B required to serve the UE 204B, a timing synchronization information available from the UE 204B and/or the like. The target network apparatus 202B may further negotiate with the source network apparatus 202A as part of the evaluation.

As shown at 112, the UE 204A may receive a first control information from the target network apparatus 202B. The first control information calculated by the target network apparatus 202B may be based on the evaluation conducted by the target network apparatus 202B based on the reported link state information of the UE 204B. The first control information may include timing synchronization information, for example, the TA, for the UE 204A and/or for the UE 204B. The first control information may further include control information for the UE 204A and/or for the UE 204B, for example, instructing the UE 204A to provide an uplink/downlink connection for the UE 204B, instructing the UE 204A to maintain the sidelink, instructing the UE 204A to terminate the sidelink, instructing the UE 204B to attach to the target network apparatus 202B, instructing the UE 204B to detach from the source network apparatus 202A and/or the like.

The first control information may be derived from an evaluation of one or more of a plurality of decision conditions and/or criteria. The decision conditions and/or criteria may include, for example, value(s) of the link state information provided by the UE 204B, cellular and/or sidelink communication requirement(s), availability of cellular resources at the source network apparatus 202A and/or the target network apparatus 202B and/or the like. Furthermore, the target network apparatus 202B may negotiate with one or more of the other network apparatus, in particular, the source network apparatus 202A in order to explore the decision conditions and/or criteria.

As shown at 114, the UE 204A transmits a second control information to the UE 204B. The second control information may be based on the first control information received from the target network apparatus 202B. The second control information may include timing synchronization information, for example, the TA, for the use by the UE 204B. The second control information may further include control information for the UE 204B, for example, instructing the UE 204B to attach to the target network apparatus 202B, instructing the UE 204B to detach from the source network apparatus 202A and/or the like.

In some embodiment of the present invention, the UE 204B is not attached (disconnected) to any network apparatus, for example, the UE 204B is out of coverage. The out of coverage UE 204B maintains the sidelink with the UE 204A either directly and/or or through one or more intermediate UEs 204. The intermediate UEs 204 may form a chain for connecting the UE 240B with the UE 204A.

Figure 4A:
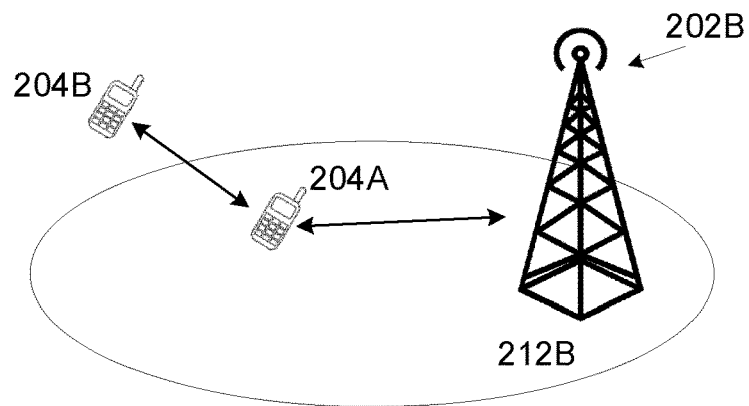
FIG. 4A and FIG. 4B are schematic illustrations of an exemplary sidelink-assisted handover, in particular during an attach phase for an out of coverage assisted UE, according to some embodiments of the present invention.
Figure 4B:
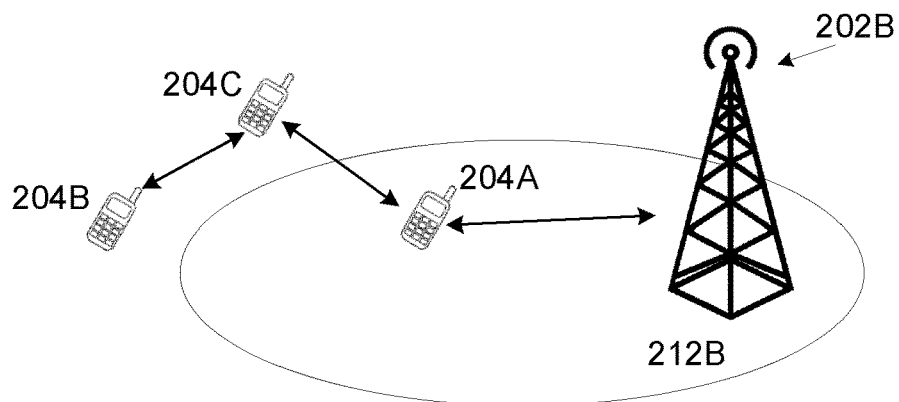

Reference is now made to FIG. 4A and FIG. 4B, which are schematic illustrations of an exemplary sidelink-assisted handover, in particular during an attach phase for an out of coverage assisted UE, according to some embodiments of the present invention. An assisted UE such as the UE 204B is out of coverage, i.e. not attached (connected) to any network apparatus such as the network apparatus 202, in particular, the UE 204B is not connected to either one of the source network apparatus 202A and the network apparatus 202B. The UE 204B maintains the sidelink with the UE 204A attached to the target network apparatus 202B as shown in FIG. 4A. Optionally, the UE 204B may maintain the sidelink with the UE 204A through one or more intermediate UEs 204, for example, a UE 204C that maintains the sidelink with both the UE 204A and the UE 204B as shown in FIG. 4B. The UE 204C may forward messages from the UE 204A to the UE 204B and vice versa.

The UE 204A and the UE 204B may maintain the sidelink since the UE 204B is out of coverage and receives its timing synchronization information from the UE 204A that in turn receives the timing synchronization information from the target network apparatus 202B. Since both the UE 204A and the UE 204B use timing synchronization information, for example, the TA originating from the target network apparatus 202B, the UE 204A and the UE 204B are timing synchronized with each other. This allows the UE 204A to maintain the sidelink (in particular the in-band sidelink) with the UE 204B simultaneously with its cellular connection to the target network apparatus 202B as shown in FIG. 4A. The same applies to the deployment scenario shown in FIG. 4B where both the UE 204B and the UE 204C are out of coverage and use timing synchronization information originating from the target network apparatus 202B received through the UE 204A.

At this stage the UE 204A is already attached (connected) to the target network apparatus 202B as shown in FIG. 4A and/or FIG. 4B. Based on instructions received from the target network apparatus 202B, the UE 204A may serve as a relay for the UE 204B while the UE 204B is out of coverage. As a relay the UE 204A may convey the link state information from the UE 204B to the target network apparatus 202B. In the other direction, as discussed before, the UE 204A may forward the timing synchronization and/or control information from the target network apparatus 202B to the UE 204B. Assuming the target network apparatus 202BA has sufficient cellular resources to serve the UE 204B, the UE 204A may be instructed by the target network apparatus 202B to further perform as the relay to transfer uplink and/or downlink data between the target network apparatus 202B and the UE 204B. The same applies in case the UE 204B is connected to the UE 204A through the intermediate UE(s) 204, for example, the UE 204C that performs as a relay between the UE 204B and the UE 204A.

Reference is made once again to FIG. 1.

As shown at 116, which is a decision point, the process 100 may branch to different paths depending on the cellular connectivity state of the UE 204B. In case the UE 204B is attached to a network apparatus 202, in particular the source network apparatus 202A as shown in FIG. 2C, the process 100 branches to 118. In case the UE 204B is not attached to any source network apparatus 202, for example, the UE 204A is out of coverage as shown in FIG. 4A and/or FIG. 4B, the process 100 branches to 124.

As shown at 118, which is another decision point, the UE 204B connected to the source network apparatus 202A as shown in FIG. 2C, forwards to the source network apparatus 202A the second instruction information received through the UE 204A. In particular, the instruction of significance is the instruction (originating from the target network apparatus 202B) to maintain the sidelink with the UE 204A and attach to the target network apparatus 202B.

The source network apparatus 202A may instruct the UE 204B to take one of several actions with respect to reconnecting and/or maintaining the sidelink with the UE 204A and/or a handover of the UE 204B to the network apparatus 202B. The decision on the type of action may be based on one or more of a plurality of decision conditions and/or criteria. Furthermore, the source network apparatus 202A may negotiate with one or more of the other network apparatus, in particular, the target network apparatus 202B in order to explore the decision conditions and/or criteria.

A first action taken by the source network infrastructure apparatus 202A may be instructing the UE 204B to detach, i.e. terminate the cellular connection with the source network apparatus 202A and maintain the sidelink with the UE 204A. In this case, the process 100 branches to 124.

A second action taken by the source network infrastructure apparatus 202A may be performing a direct handover of the UE 204B to the target network infrastructure apparatus 202B. Naturally, the direct handover based on the negotiation made between the source network apparatus 202A and the target network apparatus 202B. The direct handover may take place, for example, in case the cellular signal detected by the UE 204B from the target network apparatus 202B is sufficiently strong and the target network apparatus 202B has the cellular resources to support the UE 204B. In this case, the process 100 branches to 122.

A third action taken by the source network apparatus 202A may be instructing the UE 204B to maintain the cellular connection with the source network apparatus 202A (remain attached) and terminate the sidelink with the UE 204A. In this case, the process 100 branches to 120.

Figure 2D:
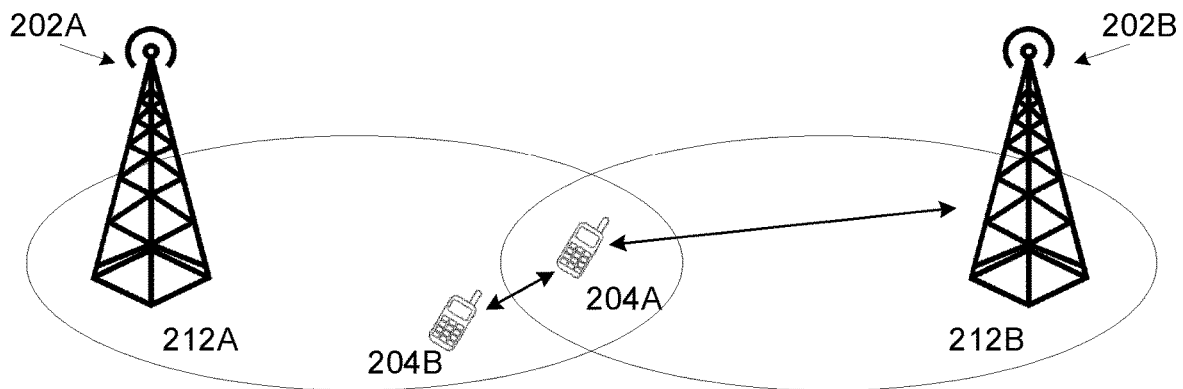
Figure 2E:
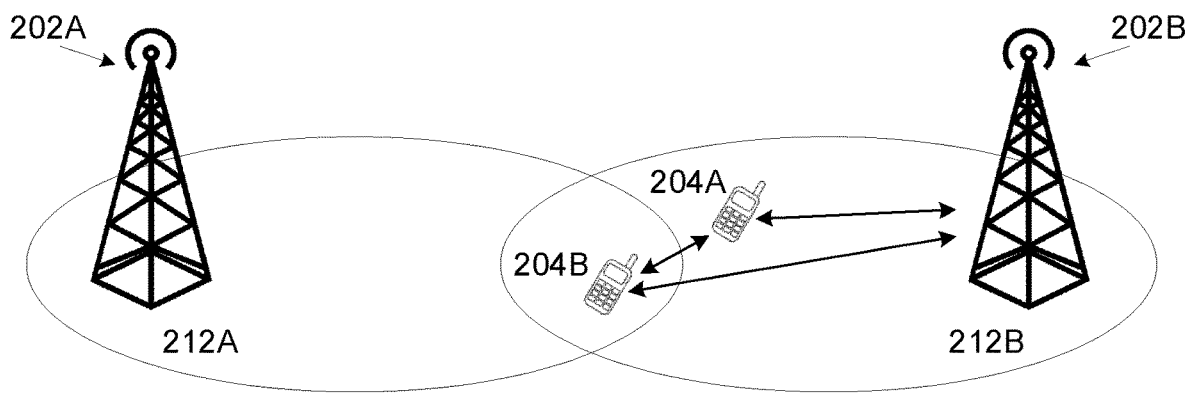
Figure 2F:
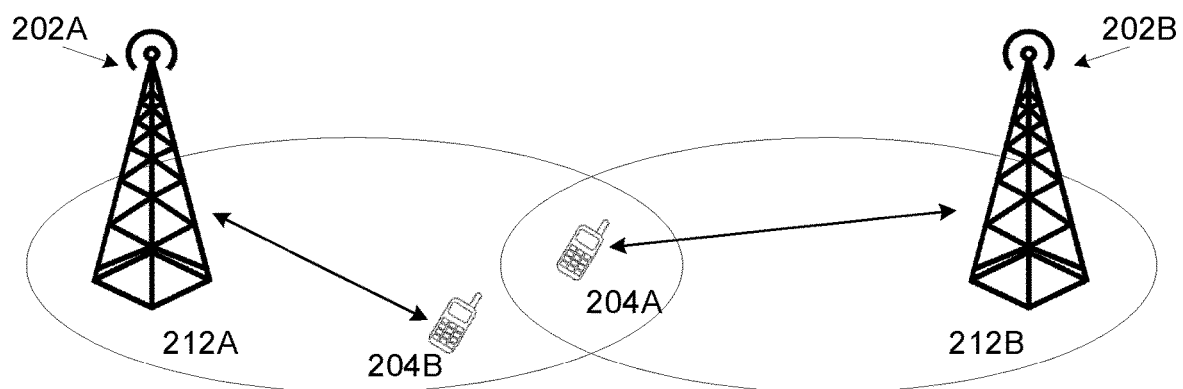

As shown at 120, following the instruction from the source network infrastructure apparatus 202A, the UE 204B terminates the sidelink with the UE 204A and remains attached to the source network infrastructure apparatus 202A as shown in FIG. 2F. Naturally, the UE 204B is not handed over.

As shown at 122, the UE 204B is directly handed over from the source network apparatus 202A to the target network apparatus 202B. During the direct handover the UE 204B may maintain the sidelink with the UE 204A. Maintaining the sidelink may assist the UE 204B to quickly adapt to the timing synchronization information originating from the target network apparatus 202B.

As shown at 124, following the instruction from the source network apparatus 202A, the UE 204B detaches from the source network apparatus 202A, i.e. disconnects the cellular connection with the source network apparatus 202A as shown in FIG. 2D.

As shown at 126, the UE 204B may attach to the target network apparatus 202B when the UE 204B is in the coverage area 212B of the target network apparatus 202B as shown in FIG. 2E. The UE 204A may use the second control information, for example, the timing synchronization information originating from the target network apparatus 202B and forwarded by the UE 204A for attaching to the target network apparatus 202B. The UE 204B is synchronized to the timing of the target network apparatus 202B provided through the second control information. As result, the UE 204B attachment process to the target network apparatus 202B may be rapid and/or smooth since the UE 204B is already adapted to the timing of the target network apparatus 202B. The attachment process is made efficient as the UE 204B may reduce and/or avoid time-consuming synchronization sequences that are typically required for the UE 204B to adapt to the timing of the target network apparatus 202B.

The UE 204B may attach to the target network apparatus 202B immediately after detaching from the source network apparatus 202A as shown in FIG. 2E in case the UE 204B is already in the coverage area 212B when detaching from the source network apparatus 202A. However, the UE 204B may not necessarily attach to the target network apparatus 202B after detaching from the source network apparatus 202A, for example, the UE 204B is out of coverage as shown in FIG. 4A and/or FIG. 4B. While the UE 204B is out of coverage the UE 204B may maintain the sidelink with the UE 240A (directly and/or through the UE 204C). While the UE 204B is out of coverage, the UE 204A may serve as the relay for transferring timing, control, and/or data between the target network infrastructure apparatus 202B and the UE 204B. When the UE 204B enters the coverage area 212B, the UE 204B may attach to the target network apparatus 202B as presented herein above.

In case the UE 204B maintained the sidelink with the UE 204A through the intermediate UE(s) 204 before attaching to the target network apparatus 202B, the UE 204B may maintain the sidelink with the intermediate UE(s) 204 also after attaching to the target network apparatus 202B.

Figure 4C:
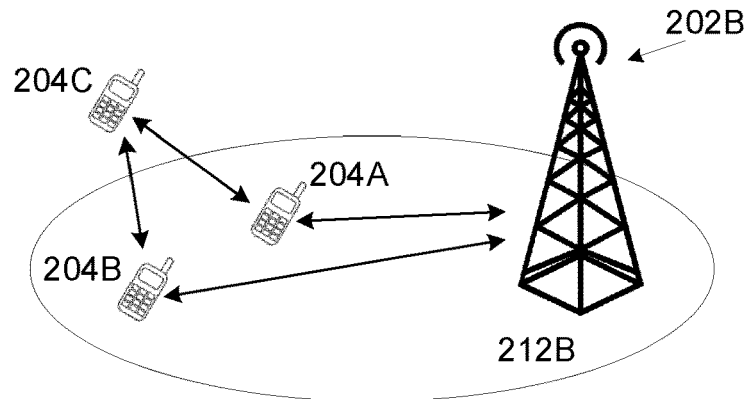
FIG. 4C is a schematic illustration of an exemplary sidelink-assisted handover, in particular following an attach phase for an out of coverage assisted UE, according to some embodiments of the present invention.

Reference is now made to FIG. 4C, which is a schematic illustration of an exemplary sidelink-assisted handover, in particular following an attach phase for an out of coverage assisted UE, according to some embodiments of the present invention. An assisting UE such as the assisting UE 204A assists the attachment of an assisted UE such as the assisted UE 204B to a network apparatus such as the target network apparatus 202B. During the assisted handover process 100, the UE 204B maintains the sidelink with the UE 204A through one or more intermediate UEs, for example, the UE 204C. After the UE 204B attaches to the target network apparatus 202B, the UE 204B may still maintain the sidelink with the UE 204C. Optionally, the UE 204A may also maintain the sidelink with the UE 204C. The sidelink may be maintained since the UE 204C is out of coverage and may use timing information synchronization originating from the target network apparatus 202B that may be received from the UE 204A and/or the UE 204B as a control information such as the second control information.

During the process 100 there may be one or more sessions in which the UE 204a and the UE 204B may need to perform a sidelink disconnect followed by an immediate sidelink reconnect in order to maintain the sidelink due to timing synchronization problems between the UE 204A and the UE 204B. The disconnect/reconnect session may be required, for example, after the UE 204A attaches to the target network apparatus 202B and while the UE 204B may still be attached to the source network apparatus 202A. Another disconnect/reconnect session may be required after the UE 204B detaches from the source network apparatus 202A and the UE 204A is already attached to the target network apparatus 202B.

The timing synchronization problems may result from the fact that typically, the source network apparatus 202A and the target network apparatus 202B may not be synchronized. As result, a timing offset may develop between the UE 204A using timing information originating from the target network apparatus 202B and the UE 204B using timing information originating from the source network apparatus 202A. Therefore, in order to maintain the sidelink, the sidelink may need to be disconnected and immediately reconnected using different timing synchronization information that may be shared between the UE 204A and the UE 204B. For example, the sidelink between the UE 204A and the UE 204B may be disconnected and immediately reconnected using timing synchronization information originating from the target network apparatus 202B and relayed by the UE 204A to the UE 204B.

However, throughout the entire handover process 100, the sidelink between the UE 204A and the UE 204B is maintained with some very short disconnect/reconnect session(s) such that from a functional point of view, the sidelink is maintained during the entire handover process 100. The synchronization problems may be of lesser impact in case the sidelink is out-of-band, as the sidelink may be maintained for higher levels of the timing offset. In case the source network apparatus 202A and the target network apparatus 202B are synchronized, the synchronization problem may be significantly reduced and typically removed such that the sidelink may be maintained during the entire handover process 100 with no synchronization offsets.

Figure 5:
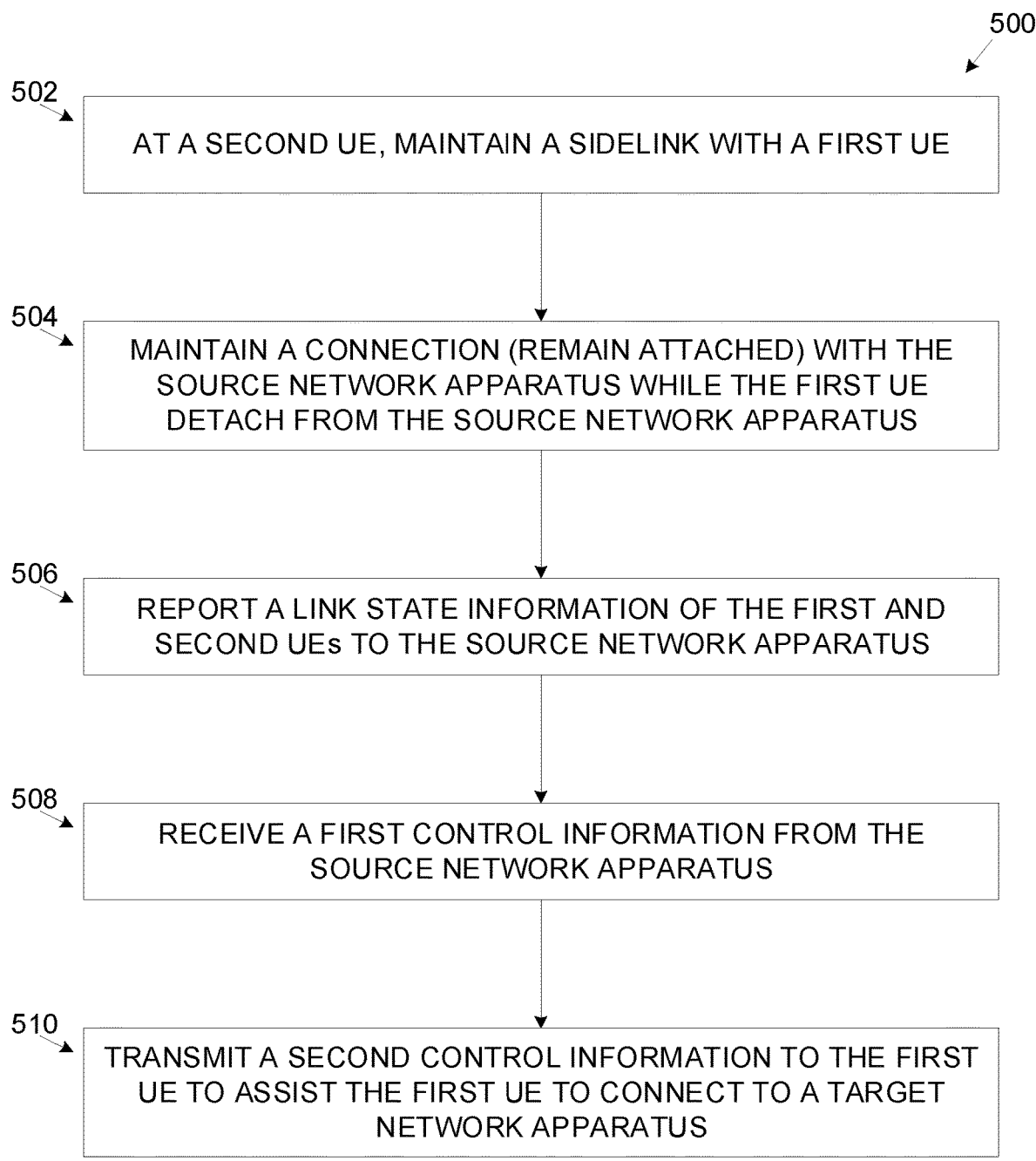
FIG. 5 is a flowchart of an exemplary process for assisting a handover of a UE between network apparatuses, in particular following a detach phase of the UE from a network apparatuses using a sidelink between the UE and at least one other UE, according to some embodiments of the present invention.

Reference is now made to FIG. 5, which is a flowchart of an exemplary process for assisting a handover of a UE between network apparatuses, in particular following a detach phase of the UE from a network apparatuses using a sidelink between the UE and at least one other UE, according to some embodiments of the present invention.

Reference is also made once again to FIG. 2A, FIG. 2B, FIG. 2C, FIG. 3A and FIG. 3B.

A process 500 may be executed by one or more assisting UEs, for example, the second UE, UE 204B, to assist a handover of one or more assisted UEs, for example, the first UE, UE 204A, from a source network apparatus such as the source network apparatus 202A to a target network apparatus such as the source network apparatus 202A. In particular, the process 500 is executed by the UE 204B that is attached to the source network apparatus 202A to assist the UE 204A after detaching from the source network apparatus 202A. The process 500 may be applied by the UE 204B during one or more scenarios, for example, the UE 204A migrates out of a source coverage area such as the coverage area 212A towards a target coverage area such as the coverage area 212B as shown in FIG. 2A. In another one or more scenarios, the UE 204B may execute the process 500 to assist the UE 204A to reconnect to the source network apparatus 202A after detaching from the source network apparatus 202A, for example, as result of the UE 204A leaving temporarily the coverage area 212A. For some deployment scenarios of the UEs 204 all steps of the process 500 while for other deployment scenarios some steps may not be applicable as described herein after.

For brevity, the process 500 is described for assisting the handover of one assisted UE 204. However, the process 500 may be extended to assist the attachment of a plurality of additional assisted UEs 204.

The UE 204B is attached (connected) to the source network apparatus 202A while maintaining the sidelink with the UE 204A during the handover process. The UE 204B assists the UE 204A by forwarding information from the source network apparatus 202A to the UE 204A and vice versa. The UE 204B may forward, for example, the timing synchronization information and/or the control information transmitted from the source network apparatus 202A to the UE 204A. In the other direction, the UE 204B may collect, for example, the link state information from the UE 204A and report the link state information to the source network apparatus 202A. The UE 204B that periodically reports its link state information to the source network apparatuses 202A may add the link state information received from the UE 204A to the reported information.

As shown at 502, the UE 204B (the second UE) now acting as the assisting UE maintains the sidelink with the UE 204A (the first UE) that is now the assisted UE. Maintaining the sidelink between the UE 204A and the UE 204B may require setting up the sidelink by connecting and/or reconnecting the sidelink during the assisted handover process 500. However, throughout the entire process 500 the UE 204B continuously maintains the sidelink with the UE 204B such that the UE 204A and UE 204A may communicate with each other as shown in FIG. 2A through FIG. 2C.

As shown at 504, simultaneously to maintaining the connection to the source network apparatus 202A, i.e. (remains attached), the UE 204B maintains the sidelink with the UE 204 that may not be attached to any network apparatus 202, in particular, the UE 204A is not attached to the source network apparatus 202A.

In some embodiment of the present invention, the UE 204A is initially attached to the source network apparatus 202A as shown in FIG. 2A. The detachment of the UE 204A from the source network apparatus 202A may be initiated by the UE204A and/or by the source network apparatus 202A as result, for example, the UE 204A may leaving the coverage area 212A. The UE 204A may request to detach due to, for example, a low signal of the cellular connection, for example, in case the SINR is below a predefined threshold level. Alternatively and/or additionally, the UE 204A may detach automatically without requesting the source network apparatus 202A to detach, for example, in case the SINR is below the predefined threshold level. The UE 204A may further initiate the detachment in case it detects one or more other network apparatuses, in particular the target network apparatus 202B presenting a better cellular connection signal, for example, a better SINR and/or the like. In case the detachment is initiated by the source network apparatus 202A the detachment instruction to the UE 204A may result from, for example, a poor cellular connection to the UE 204A and/or cellular resource(s) are unavailable at the source network apparatus 202A for serving the UE 204A. The source network apparatus 202A may also initiate the detachment following negotiations with one or more other network apparatuses, in particular the target network apparatus 202B that picks up the cellular signal from the UE 204A. The UE 204A may also initiate the detachment when picking up the cellular signal from the target network apparatus 202B that may result from, for example, the UE 204A advancing into the coverage area 212B as shown in FIG. 2B.

While the UE 204A is attached to the source network apparatus 202A the UE 204B and the UE 204A may maintain the sidelink as they are both synchronized with other since they are both attached to the source network apparatus and use timing information, for example, the TA provided by the source network apparatus 202A.

In some embodiments of the present invention, the UE 204A is not attached to any network apparatus 202, for example, the UE 204A is out of coverage as shown in FIG. 3A and FIG. 3B.

While the UE 204A is out of coverage and the UE 204B is attached to the source network apparatus 202A, the sidelink is maintained between the UE 204B and the UE 204A using the timing information originating from the source network apparatus 202A. The sidelink may be maintained either directly as shown in FIG. 3A or through one or more intermediate UEs 204, for example, the UE 204C as shown in FIG. 3B. The intermediate UEs 204 may form a chain for connecting the UE 240A with the UE 204B. The UE 204A and the UE 204B may maintain the sidelink since the UE 204A is out of coverage and receives its timing synchronization information from the UE 204B that in turn receives the timing synchronization information from the source network apparatus 202A. Since both the UE 204A and the UE 204B use timing synchronization information, for example, the TA originating from the source network apparatus 202A, the UE 204A and the UE 204B are timing synchronized with each other. This allows the UE 204B to maintain the sidelink (in particular the in-band sidelink) with the UE 204A simultaneously with its cellular connection to the source network apparatus 202A as shown in FIG. 3A. The same applies to the deployment scenario shown in FIG. 3B where both the UE 204A and the UE 204C are out of coverage and use timing synchronization information originating from the source network apparatus 202A received through the UE 204B.

As shown at 506, the UE 204B reports to the source network apparatus 202A the link state information received from the UE 204A through the sidelink such that the source network apparatus is made aware of the presence of the UE 204A and its link state information. The UE 204B may forward the link state information of the UE 204B to the source network apparatus 202A while reporting its own link state information, e.g. periodically, as part of the cellular communication protocol. Based on the reported link state information of the UE 204B, the source network apparatus 202A may evaluate one or more operations that may be taken with respect to the UE 204A, for example, evaluating a handover of the UE 204A to the target network apparatus 202B and/or the like. The source network apparatus 202A may also initiate a negotiation session with the target network apparatus 202B as part of the evaluation. As part of the evaluation the source network apparatus 202A may consider its availability of cellular resources to serve the UE 204A, a timing synchronization information available from the UE 204A and/or the like.

Assuming the source network apparatus 202A has sufficient cellular resources to serve the UE 204A, the UE 204B may be instructed by the source network apparatus 202A to further perform as the relay to transfer uplink and/or downlink data between the source network apparatus 202A and the UE 204A. When connected through the intermediate UE 204C the UE 204C performs as the relay between the UE 204A and the UE 204B for transferring the uplink and/or downlink data between the UE 204B and the UE 204A.

As shown at 508, the UE 204A may receive a first control information from the source network apparatus 202A. The control information calculated by the source network apparatus 202A may be based on the evaluation conducted by the source network apparatus 202A based on the reported link state information of the UE 204A. The first control information may include timing synchronization information, for example, the TA, for the UE 204B and/or for the UE 204A. The first control information may further include control information for the UE 204B and/or for the UE 204A, for example, instructing the UE 204B to provide an uplink/downlink connection for the UE 204A, instructing the UE 204B to maintain the sidelink, instructing the UE 204B to terminate the sidelink, instructing the UE 204A to attach to the target network apparatus 202B, instructing the UE 204B to detach from the source network apparatus 202A and/or the like.

As shown at 510, the UE 204B transmits a second control information to the UE 204A. The second control information may be based on the first control information received from the source network apparatus 202A. The second control information may include timing synchronization information, for example, the TA, for use by the UE 204A. The second control information may further include control information for the UE 204A, for example, instructing the UE 204A to attach to the target network apparatus 202B, instructing the UE 204A to detach from the source network apparatus 202A and/or the like.

Based on the link state information received from the UE 204A, on the decision criteria and/or the negotiation with the target network apparatus 202B, the source network infrastructure apparatus 202A may further perform a direct handover of the UE 204A to the target network infrastructure apparatus 202B. This may take place in case, for example, the UE 204A is within the coverage area 212B as shown in FIG. 2B and the UE 204A detects a sufficiently strong cellular signal from the target network apparatus 202B. This decision may be taken after evaluating the target network apparatus 202B has sufficient cellular resources to serve the UE 204A.

As discussed before, while the UE 204B may apply the process 500 for assisting the UE 204A that is migrates directly from the coverage area 212A to the coverage area 212B as shown in FIG. 2B and FIG. 2C, the UE 204B may also apply the process 500 for assisting the UE 204A in other deployment scenarios. For example, in a scenario where the UE 204A goes through a no coverage area as shown in FIG. 3A and FIG. 3B before migrating into the coverage area 212B.

Figure 6A:
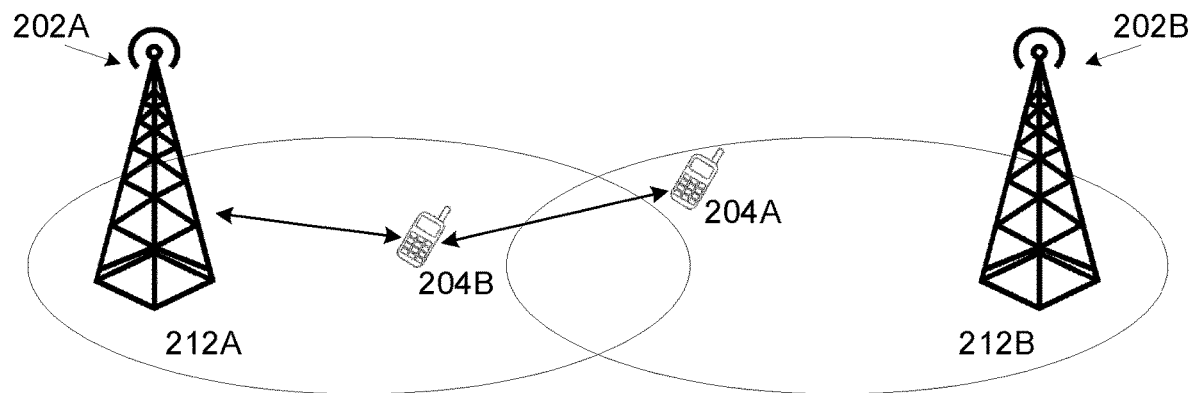
FIG. 6A and FIG. 6B are schematic illustrations of an exemplary sidelink-assisted handover, in particular following a detach phase for an out of coverage assisted UE, according to some embodiments of the present invention.
Figure 6B:
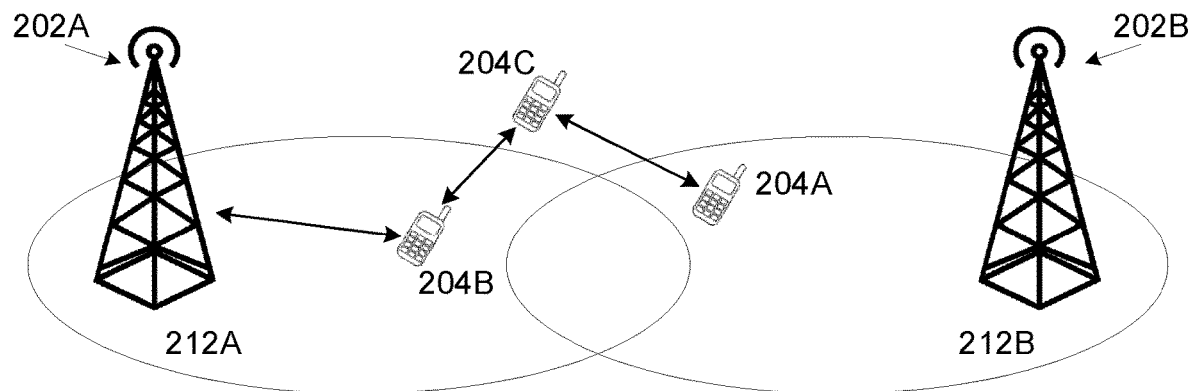

Reference is now made to FIG. 6A and FIG. 6B, which are schematic illustrations of an exemplary sidelink-assisted handover, in particular following a detach phase for an out of coverage assisted UE, according to some embodiments of the present invention. An assisting UE such as the second UE, UE 204B simultaneously maintains a cellular connection with a network apparatus such as the source network apparatus 202A and an assisted UE such as the first UE, UE 204A. The UE 204A that was previously in a no coverage area as shown in FIG. 3A, now enters a coverage area such as the coverage area 212B of a network apparatus such as the network apparatus 202B. As shown in FIG. 6A, the UE 204B maintains the sidelink directly with the UE 204A while the UE 204A travels into the coverage area 212B. The UE 204B may maintain the sidelink with the UE 204A traveling into the coverage area 212B through one or more intermediate UEs, for example, the UE 204C as shown in FIG. 6B.

Through the sidelink the UE 204B that is attached to the source network apparatus may assist the UE 204A to attach to the target network apparatus 202B by forwarding information from the source network apparatus 202A to the UE 204A and vice versa.

In case the source network apparatus 202A and the target network apparatus 202B are synchronized, the UE 204A that uses the timing synchronization received from the source network apparatus 202A through the UE 204B is already adapted to the timing of the target network apparatus 202B thus the attach phase may be significantly more rapid, smooth and/or efficient. However even in case the source network apparatus 202A and the target network apparatus 202B are not synchronized, still the timing offset may typically not be extremely large thus the UE 204A may need to search for the cellular signal of the target network apparatus 202B in a significantly narrower frequency band.

Moreover, during the entire period in which the UE 204A detached from any network apparatus 212, the UE 204 may still have an uplink and/or a downlink data connection through the source network apparatus 202A with the UE 204B serving as a relay.

The process 100 and the process 500 and/or parts thereof may be executed sequentially with the first UE, UE 204A and the second UE, UE 204B switching roles. The UE 204A applies the process 100 to assist the handover of the UE 204B while the UE 204B may apply the process 500 to assist the attachment of the UE 204A. This may typically take place while both the UE 204A and the UE 204B are travelling (migrating) in the same direction from the coverage area 212A towards the coverage area 212B.

However the process 100 and the process 500 and/or parts thereof may also be executed independently from each other to support only one or role phases of the handover process, for example, the detach phase and/or the attach phase.

As discussed before the UE 204B may also execute the process 500 to assist the UE 204A to reconnect to the source network apparatus 202A after temporarily detaching from the source network apparatus 202A.

Reference is made one again to FIG. 5, FIG. 2A, FIG. 3A and FIG. 3B.

Figure 7A:
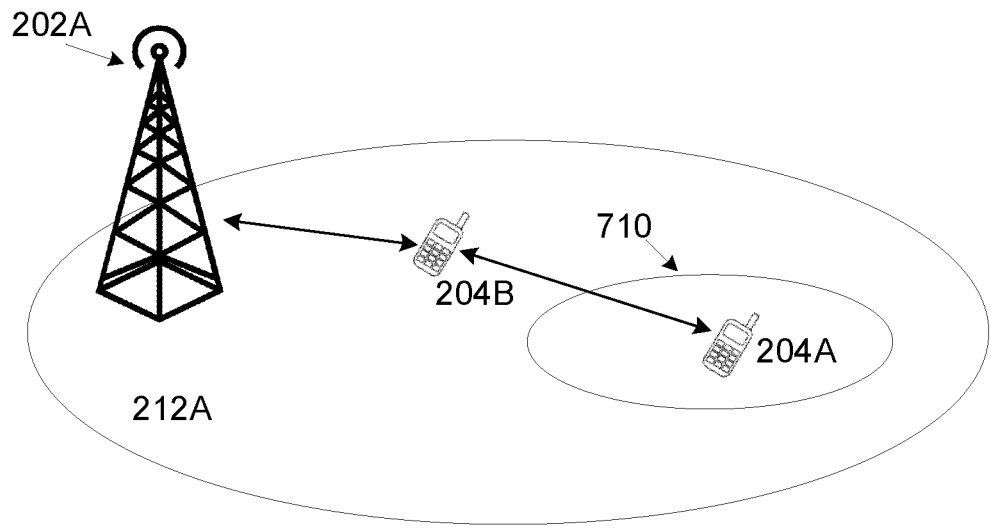
FIG. 7A and FIG. 7B are schematic illustrations of an exemplary sidelink-assisted attachment, in particular following a temporary detachment of the assisted UE, according to some embodiments of the present invention.
Figure 7B:
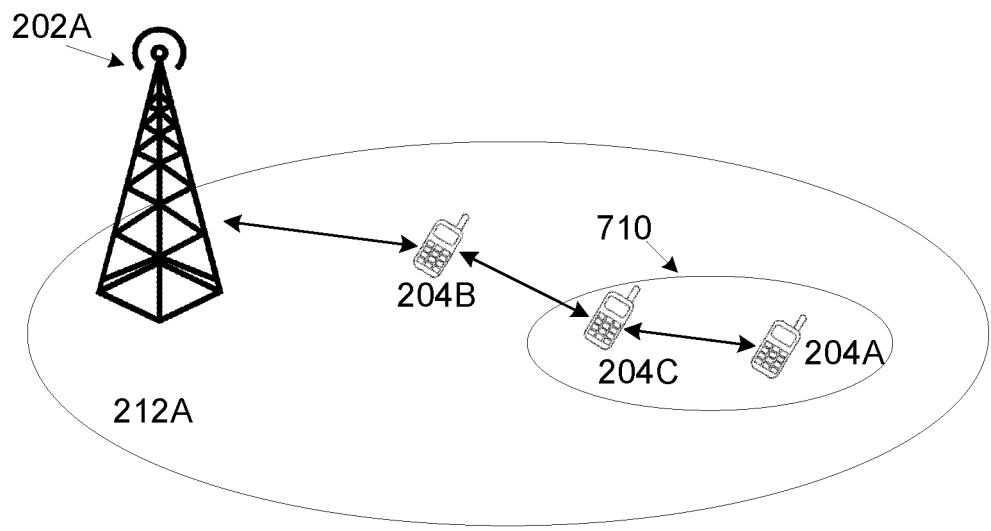

Reference is also made to FIG. 7A and FIG. 7B, which are schematic illustrations of an exemplary sidelink-assisted attachment, in particular following a temporary detachment of the assisted UE, according to some embodiments of the present invention. An assisting UE such as the second UE, UE 204B simultaneously maintains a cellular connection with a network apparatus such as the source network apparatus 202A and an assisted UE such as the first UE, UE 204A.

The UE 204A that was initially attached to the source network apparatus 202A as shown in FIG. 2A may travel into a no coverage area. For example, the UE 204A may travel outside the coverage area 212A as shown in FIG. 3A and/or FIG. 3B. As another example, as shown in FIG. 7A and/or FIG. 7B, the UE 204A may travel into a no coverage area 710 that is within the coverage area 212A. The no coverage area 710 may be, for example, a tunnel, a valley, a mountain terrain and/or the like in which the cellular signal from the source network apparatus 202A may be insufficient for the UE 204A to maintain the cellular connection. The UE 204A may thus detach from the source network apparatus 202A either by instruction from the source network apparatus 202A and/or automatically in case, for example, the SINR is below the predefined threshold level.

The UE 204B may maintain the sidelink with the UE 204A either directly as shown in FIG. 7A and/or through one or more intermediate UEs, for example, the UE 204C as shown in FIG. 7B.

While the UE 204A is out of coverage the UE 204B may apply the process 500, in particular, the steps 502, 504, 506, 508 and 510 to assist the UE 204A by forwarding information from the UE 204A to the source network apparatus 202A and vice versa.

In case the UE 204A that is travelling reaches an area in which the cellular signal from the source network apparatus 202A is strong enough to attach, the UE 204A that is already using the timing synchronization originating from the source network apparatus 202A may easily attach to the source network apparatus 202A. It should be noted that for such a scenario, the source network apparatus 202A is considered as the target network apparatus to which the UE 204A attempts to attach.

Such a scenario may take place, for example, when the UE 204A was initially attached to the source network apparatus 202A as shown in FIG. 2A, travelled outside the coverage area 212A as shown in FIGS. 3A and/or 3B and returns into the coverage area 212A. As another example, the UE 204A may exit the no coverage area 710 and re-enter the coverage area 212A.

Figure 8:
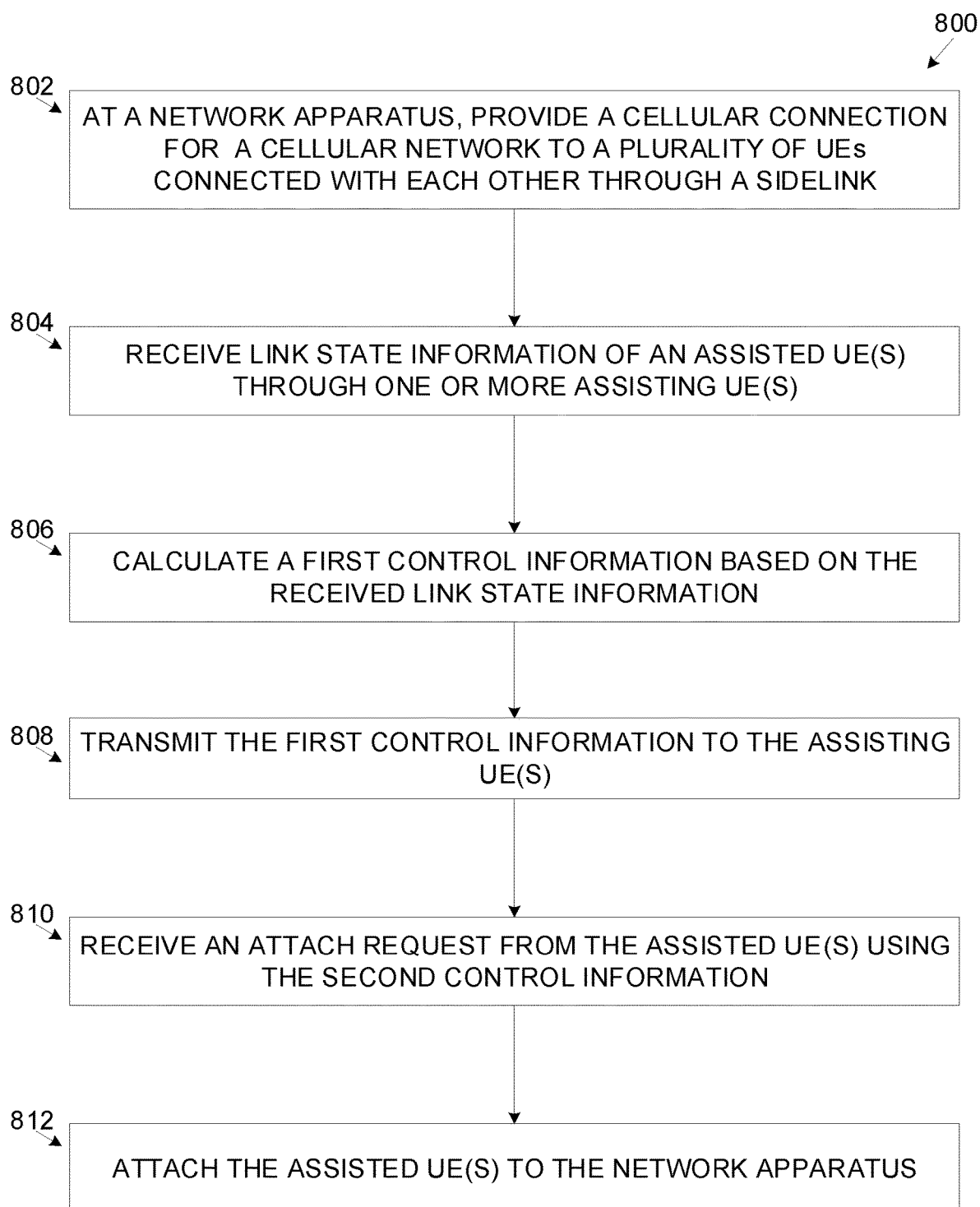
FIG. 8 is a flowchart of an exemplary process of a network apparatus handing over one or more UEs connected by a sidelink, according to some embodiments of the present invention.

Reference is now made to FIG. 8, which is a flowchart of an exemplary process of a network apparatus handing over one or more UEs connected by a sidelink, according to some embodiments of the present invention.

Reference is also made once again to FIG. 2A through FIG. 2F.

A process 800 may be executed by one or more network apparatus for handing over one or more UEs, for example, a first UE such as, for example, the UE 204A and/or a second UE such as, for example, the UE 204B. The process 800 may be a complementary process for process 100 and/or the process 500 in which one or more of the UE 204A and/or the UE 204B may assist each other UE during the attach phase and/or following the detach phase as presented in the processes 100 and/or 500. While the processes 100 and 500 are presented from the point of view of the first UE 204A and the second UE 204B executing the processes 100 and 500 respectively, the process 800 is presented from the point of view of the respective network apparatus, the source network apparatus 202A and the target network apparatus 202B.

For some deployment scenarios of the UEs 204, all steps of the process 800 while for other deployment scenarios some steps may not be applicable as described herein after. The same applies for the sidelink-assisted handover phases as presented in FIG. 2A through FIG. 2F. For brevity, the process 800 is described for handing over one UE 204. However, the process 800 may be extended to hand over a plurality of additional UEs 204.

As described before, during the assisted handover the UE 204A and the UE 204B may switch their roles, such that the UE 204A may assist the UE 204B during some handover scenarios and/or phases while the UE 204B may assist the UE 204A during other handover scenarios and/or phases. In order to maintain consistency the UEs 204 are therefore designated the "assisting UE 204" and the "assisted UE 204". The assisting UE 204 is in coverage and attached to one of the network apparatuses designated the "attached network apparatus 202", for example, a source network apparatus such as the source network apparatus 202A or a target network apparatus such as the target network apparatus 202B. The assisted UE 204 however may be in and out of coverage and may therefore not be attached to the attached network apparatus 202 during one or more of the handover phases.

During the assisted handover the assisting UE 204 and the assisted UE 204 maintain a sidelink between them such that the assisting UE 204 assists the handover by forwarding information from the network apparatus(s) 202 to the assisted UE 204 and vice versa. The assisting UE 204 may forward, for example, the timing synchronization information and/or the control information transmitted from the network apparatus 202 to which the assisting UE 204 is attached. In the other direction, the assisting UE 204 may collect, for example, the link state information from the assisted UE 204 and report the link state information to the source network apparatus 202A. The assisting UE 204 that periodically reports its link state information to the attached network apparatuses 202 may add the link state information received from the assisted UE 204 to the reported information.

As shown at 802, the attached network apparatus 202, for example, the source network apparatus 202A and/or the target network apparatus 202B provides connectivity to a cellular network for one or more of a plurality of UEs 204, for example, the UE 204A and/or the UE 204B.

As shown at 804, the attached network apparatus 202 receives link state information reported by the attached assisting UE 204. The reported link state information may include link state information of the assisted UE 204 received by the assisting UE 204 through the sidelink with the assisted UE 204. The assisting UE 204 may include forward the link state information of the assisted UE 204 as part of its own reported link state information.

As shown at 806, the attached network apparatus 202 calculates a first control information. The first control information may be derived from the evaluation conducted by the attached network apparatus 202 based on the reported link state information of the assisted UE 204. The first control information may include timing synchronization information, for example, the TA, for the assisting UE 204 and/or for the assisted UE 204.

The first control information may further include control information for the assisting UE 204 and/or for the assisted UE 204, for example, instructing the assisting UE 204 to provide an uplink/downlink connection for the assisted UE 204, instructing the assisting UE 204 to maintain the sidelink, instructing the assisting UE 204 to terminate the sidelink, instructing the assisted UE 204 to attach, instructing the assisted UE 204 to detach and/or the like. The first control information may be based on one or more of the plurality of decision conditions and/or criteria. Furthermore, the attached network apparatus 202 may negotiate with one or more of the other network apparatus. For example, in case the assisted UE 204 is migrating from the coverage area 212A towards the coverage area 212B as shown in FIG. 2D, the source network apparatus 202A may negotiate with the target network apparatus 202B the instruction(s) (that may be part of the first control information) to the assisting UE 204 and/or the assisted UE 204.

As shown at 808, the attached network apparatus 202 transmits the first control information to the assisting UE 204.

As shown at 810, the attached network apparatus 202 may receive an attach request from the assisted UE 204. For example, as shown in FIG. 2A, the UE 204A being the assisted UE 204 migrates into the coverage area 212B and may request to attach to the target network apparatus 202B. In another example, as shown in FIG. 2D, the UE 204B being the assisted UE 204 migrates into the coverage area 212B and may request to attach to the target network apparatus 202B. The attach request received from the assisted UE 204 may be based on the second control information received from the assisting UE 204 that in turn is based on the first control information received from the attached network apparatus. For example, the attached network apparatus 202 may instruct (through the first control information) the assisted UE 204 to attach to the attached network apparatus 202. In such case, the assisted UE 204 may adapt the timing synchronization information, for example the TA provided by the attached network apparatus 202 and forwarded by the assisting UE 204.

In other deployment scenarios, for example, as described for the process 500 and shown in FIG. 2C, the attached network apparatus 202 being the source network apparatus 202A is not receiving the attach request that is transmitted by the assisted UE 204, being the UE 204A to the target network apparatus 202B. However, the assisted UE 204A may be assisted by the UE 204B attached to the source network apparatus 202A as described in the process 500.

In yet other deployment scenarios, for example, as described for the process 500 and shown in FIG. 7A and/or FIG. 7B, the attached network apparatus 202 being the source network apparatus 202A receives the attach request from the UE 204A being the assisted UE 204. The UE 204A is temporarily detached from the source network apparatus 202A but maintains the sidelink with the assisting UE 204B performing as the assisting UE 204.

As shown at 912, the attached network apparatus 202 receives accepts the attach request and attaches the assisted UE 204 to the attached network apparatus 202 to connect the assisted UE 204 to the cellular network. By adapting to the timing synchronization information originating from the attached network apparatus 202, the assisted UE 204 may quickly attach to the attached network apparatus 202 avoiding a prolonged synchronization sequence that may typically be involved with the attachment.

As discussed before the processes 100 and/or 500 and the complementary process 800 may be applied for the first handover mode and/or for the second handover mode. Where in the first mode, the handover may be initiated by one or more of the UEs 204 and in the second mode, the handover may be initiated by one or more of the network apparatuses 202.

The UE(s) 204 may initiate the handover (the first mode) in one or more situations, for example, on detecting an insufficiently high cellular signal from its serving network apparatus 202, on detecting a sufficiently high cellular signal from another network apparatus 202 and/or the like. As described before, the handover, in particular the terminating the cellular connection during the detach phase, may be initiated automatically by the UE(s) 204 and/or it may be instructed by the network apparatus 202 serving the UE(s) 204.

Under some conditions, the network apparatus 202 may be the one to initiate the handover (the second mode). Such conditions may include, for example, detecting the UE(s) 204 is out of coverage of a serving network apparatus 202, detecting the UE 204A enters a coverage area 212 of another network apparatus 202, detecting the UE 204A is migrating (travelling) toward a coverage area 212 of the other network apparatus 202 and/or the like. These conditions may be identified by the network apparatus 202 by analyzing and and/or evaluating the link state information received from the UE (s) 204. The network apparatus 202 may further evaluate information received from one or more other network apparatuses 202 relating to the UE(s) 204, for example, a network apparatus 202A the UE(s) 204 is currently/previously attached to and/or the like. The network apparatus 202 may also evaluate availability of its own cellular resources needed to serve the UE(s) 204 such that the UE(s) 204 may be properly served with the cellular service after handed over.

Figure 9:
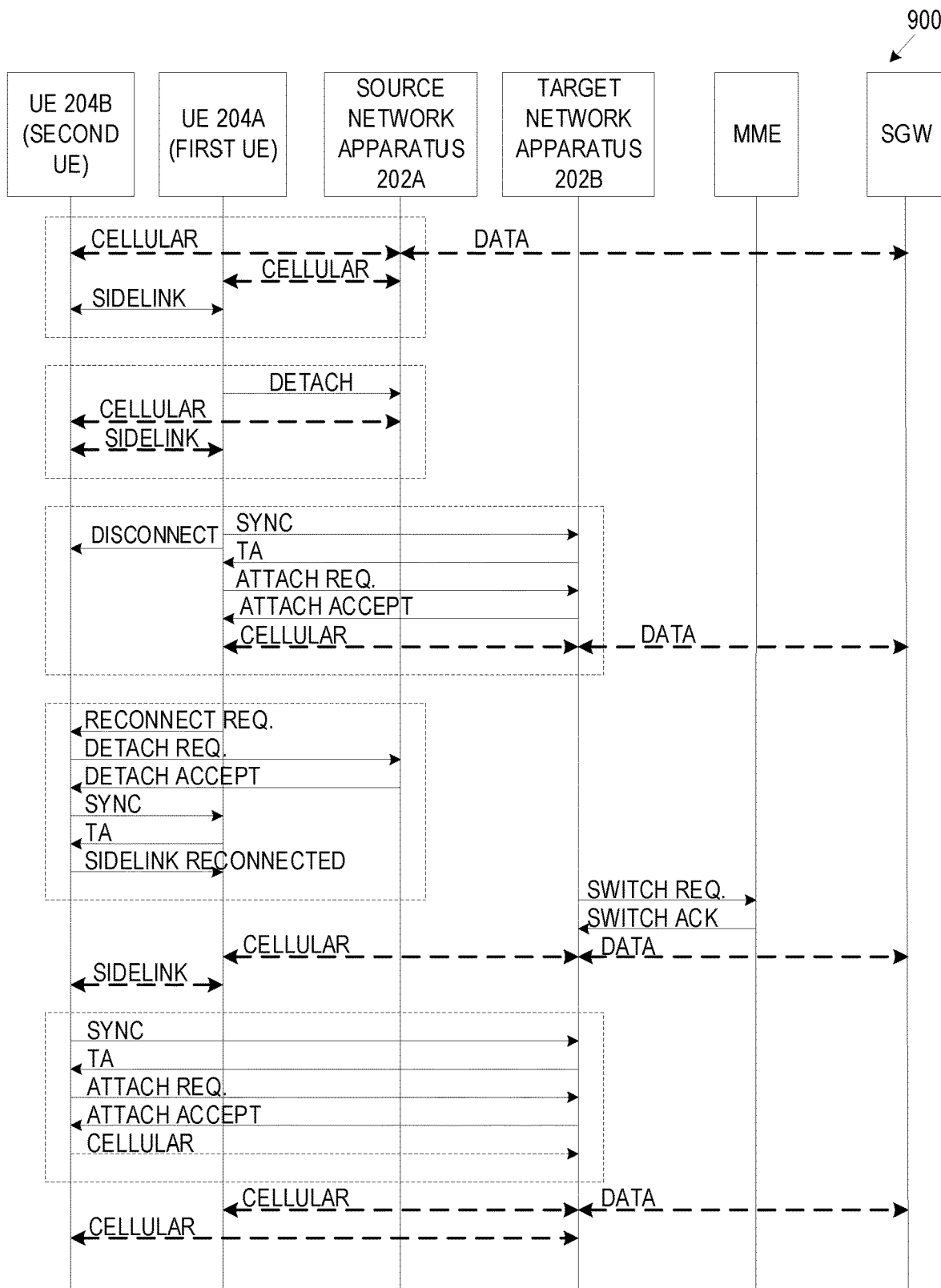
FIG. 9 is a schematic illustration of an exemplary interaction during a sequence of an exemplary sidelink-assisted handover initiated by a UE, according to some embodiments of the present invention.

Reference is now made to FIG. 9, which is a schematic illustration of an interaction during a sequence of an exemplary sidelink-assisted handover initiated by a UE, according to some embodiments of the present invention. An interaction sequence 900 presents an exemplary sequence of a UE initiated assisted handover (the first mode). The interaction sequence 900 may be a combination of assisted handover processes such as the process 100 and the process 500 with a complementary process such as the process 800 in an exemplary network deployment as described in FIG. 2A through FIG. 2E. The interaction sequence 900 is sequentially arranged from the top towards the bottom of the interaction sequence 900. For completeness, the MME and SGW are also presented, however the interaction with these network elements is out of scope of the present invention. Initially two UEs such as the first UE, UE 204A, and the second UE, UE 204B, are connected to a cellular network through a network apparatus such as the source network infrastructure apparatus 202A as shown in FIG. 2A. Both the UE 204A and the UE 204B have a cellular connection to the source network apparatus 202A for uplink/downlink data transfer. The UE 204A and the UE 204B are connected to each other through the sidelink. During the first part of the interaction sequence 900 during which the UE 204A is handed over from the source network apparatus 202A to a network apparatus such as the target network apparatus 202B, the UE 204B acts as the assisting UE to assist the UE 204A acting as the assisted UE. At some point in time the UE 204A detaches from the source network apparatus 202A as shown in FIG. 2B and described in step 106 of the process 100. At this stage, the UE 204B maintains a cellular connection to the source network apparatus 202A and the sidelink with the UE 204A. When the UE 204A enters a coverage area such as the coverage area 212B of the target network apparatus 202B, the UE 204A tries to attach to it as shown in FIG. 2C and described in step 108 of the process 100. Prior and during the attachment to the target network apparatus, the UE 204A may be assisted by the UE 204B as described in step 108 of the process 500. The UE 204A receives timing synchronization information from the target network apparatus 202B and may therefore terminate the sidelink with the UE 204B since the offset in the timing may be above the predefined threshold level (since typically the target network apparatus 202B and the source network apparatus 202A are not synchronized). After the UE 204A attaches to the target network apparatus 202B and establishes the cellular connection, the UE 204A tries to reconnect to the UE 204B. At this time the UE 204A and the UE 204B may switch their roles such that the UE 204A may now perform as the assisting UE 204 while the UE 204B may now become the assisted UE 204. After conveying the reconnect request to the source network apparatus 202A, the source network apparatus 202A may instruct the UE 204B to detach. The sidelink is reconnected between the UE 204A and the UE 204B and the UE 204A may serve as a relay for the UE 204B as shown in FIG. 2D and described in step 114 of the process 100. Finally, after receiving the timing synchronization information from the target network apparatus 202B, the UE 204B tries to attach to the target network apparatus 202B as shown in FIG. 2E and described in step 126 of the process 100.

Figure 10:
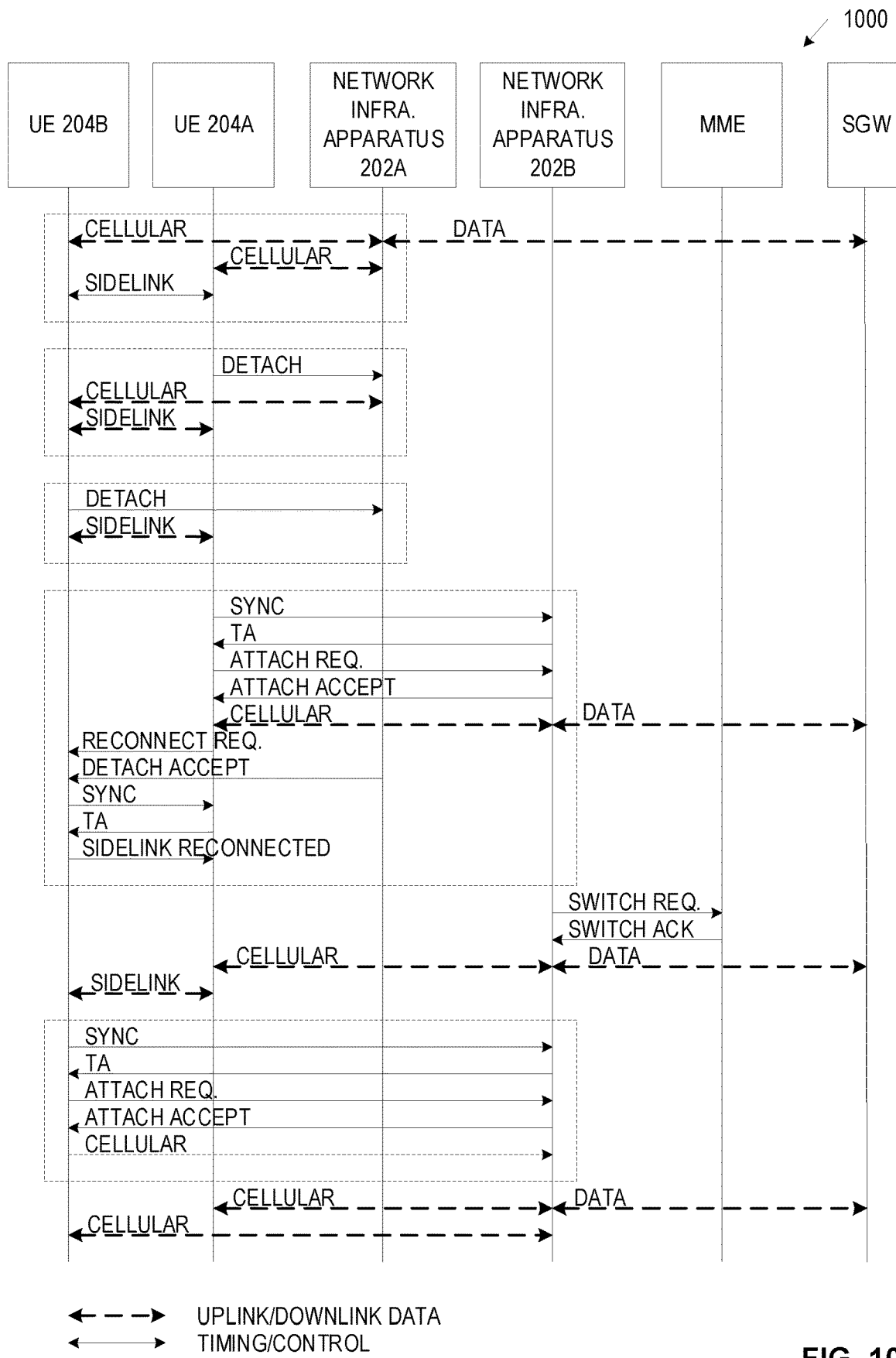
FIG. 10 is a schematic illustration of an exemplary interaction during a sequence of an exemplary sidelink-assisted handover initiated by a network apparatus, according to some embodiments of the present invention.

Reference is now made to FIG. 10, which is a schematic illustration of an interaction during a sequence of an exemplary sidelink-assisted handover initiated by a network apparatus, according to some embodiments of the present invention. An interaction sequence 1000 presents an exemplary sequence of a network apparatus initiated assisted handover (the second mode). The interaction sequence 900 may be a combination of assisted handover processes such as the process 100 and the process 500 with a complementary process such as the process 800 in an exemplary network deployment as described in FIG. 2A through FIG. 2E. The interaction sequence 1000 is sequentially arranged from the top towards the bottom of the interaction sequence 1000. For completeness, the MME and SGW are also presented, however the interaction with these network elements is out of scope of the present invention. Initially two UEs such as the UE 204A and the UE 204B are connected to a cellular network through a network apparatus such as the source network apparatus 202A as shown in FIG. 2A. Both the UE 204A and the UE 204B have a cellular connection to the source network apparatus 202A for uplink/downlink data transfer. The UE 204A and the UE 204B are connected to each other through a sidelink. At some point in time the UE 204A detaches from the source network apparatus 202A as shown in FIG. 2B and described in step 106 of the process 100. At this time the UE 204B acts as the assisting UE 204 and the UE 204A is the assisted UE 204. Later on, the UE 204B also detaches from the source network apparatus 202A while maintaining the sidelink with the UE 204A as shown in FIG. 2D and described in step 124 of the process 100. When the UE 204A enters the coverage area 212B of the target network apparatus 202B, the UE 204A tries to attach to it as shown in FIG. 2C and described in step 108 of the process 100. After the UE 204A attaches to the target network apparatus 202B and establishes the cellular connection, the UE 204A may need to reconnect to the UE 204B as shown in FIG. 2C to maintain the sidelink. At this time the UE 204A and the UE 204B may switch their roles such that the UE 204A may now perform as the assisting UE 204 while the UE 204B may now become the assisted UE 204. The UE 204A receives timing synchronization information from the target network infrastructure apparatus 202B and may therefore need to reconnect the sidelink with the UE 204B in case the sidelink timing was based on timing provided by the UE 204B. If however the sidelink timing was provided by the UE 204A, the sidelink may be maintained as before avoiding the need to reconnect. The sidelink is reconnected between the UE 204A and the UE 204B and the UE 204A may serve as a relay for the UE 204B as shown in FIG. 2D and described in step 110 of the process 100. Finally, after receiving the timing synchronization information from the target network infrastructure apparatus 202B, the UE 204B tries to attach to the target network infrastructure apparatus 202B as shown in FIG. 3E and described in step 126 of the process 100.

Figure 11:
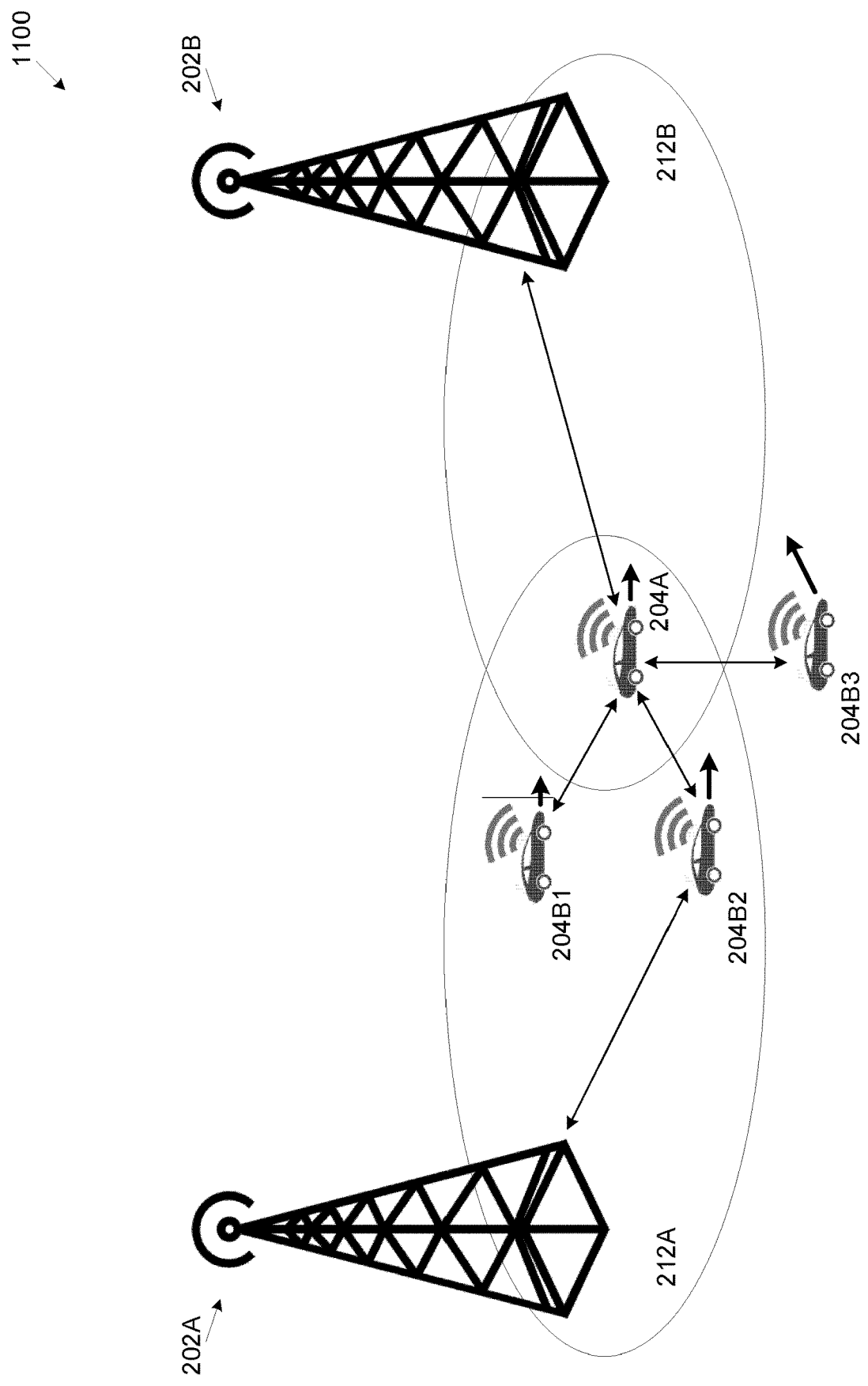
FIG. 11 is a schematic illustration of an exemplary system for assisting a handover, in particular during an attach phase, of a plurality of UEs between network infrastructure apparatuses, according to some embodiments of the present invention.

Reference is now made to FIG. 11, which is a schematic illustration of system for assisting a handover, in particular during an attach phase, of a plurality of UEs between network infrastructure apparatuses, according to some embodiments of the present invention. A system 1100 comprises two network apparatuses such as the source network apparatus 202A and the target network apparatus 202B each having a coverage area 212A and 212B respectively. A process such as the process 100 may be carried out by an assisting UE such as the UE 204A to assist a handover of a plurality of assisted UEs 204, for example, a UE204B1, a UE 204B2 and/or a UE 204B3. Such a scenario may typically occur when the UE 204B1, the UE 204B2 and/or the UE 204B3, for example, mobile phone(s) used by user(s) travelling in one or more vehicles, V2X and/or V2V vehicle(s) and/or the like are migrating from the coverage area 212A towards the coverage area 212B. The assisted UEs may be attached (connected via a cellular link) to the source network apparatus 202A such as, for example, the UE 204B2 or they may not be attached such as, for example, the UE 204B1 and/or the UE 204B3. The UE 204B3 may not have a cellular connection since it may be out of the coverage areas, 212A and/or 212B thus unable to attach to the source network apparatus 202A or the target network apparatus 202B respectively.

Figure 12:
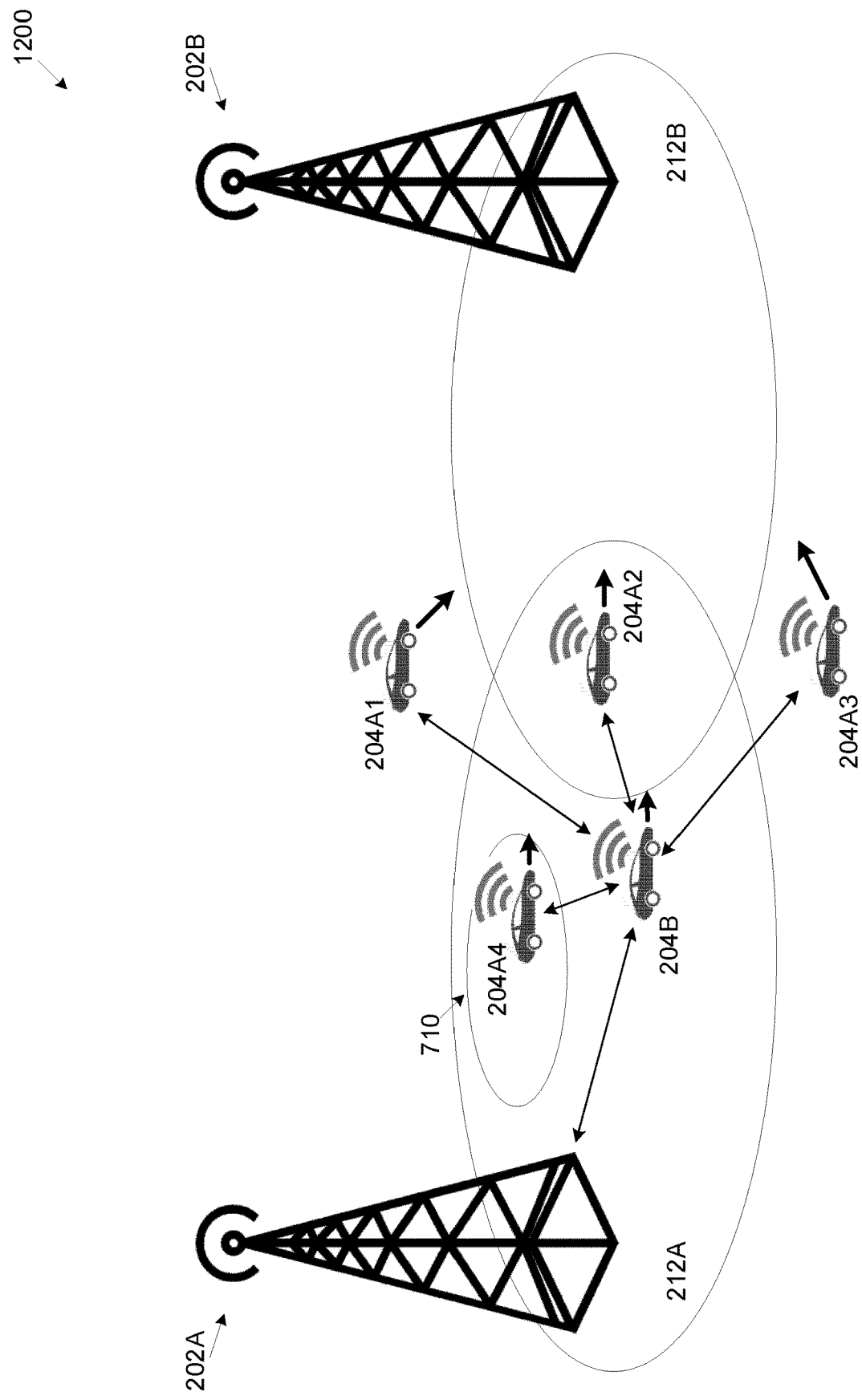
FIG. 12 is a schematic illustration of an exemplary system for assisting a handover, in particular during following a detach phase, of a plurality of UEs between network infrastructure apparatuses, according to some embodiments of the present invention.

Reference is now made to FIG. 12, which is a schematic illustration of system for assisting a handover, in particular during following a detach phase, of a plurality of UEs between network infrastructure apparatuses, according to some embodiments of the present invention. A system 1200 comprises two network apparatuses such as the source network apparatus 202A and the target network apparatus 202B each having a coverage area 212A and 212B respectively. A process such as the process 500 may be carried out by an assisting UE such as the UE 204B to assist a handover of a plurality of assisted UEs 204, for example, a UE204A1, a UE 204A2, a UE 204A3 and/or a UE 204A4. Such a scenario may typically occur when, for example, the UE 204A1, the UE 204A2 and/or the UE 204A3, for example, mobile phone(s) used by user(s) travelling in one or more vehicles, V2X and/or V2V vehicle(s) and/or the like are migrating from the coverage area 212A towards the coverage area 212B. In another scenario the UE 204B may assist the UE 204A4 that is gone into a temporary no coverage area such as the no-coverage area 710, to reconnect to the source network apparatus 202A.

Figure 13:
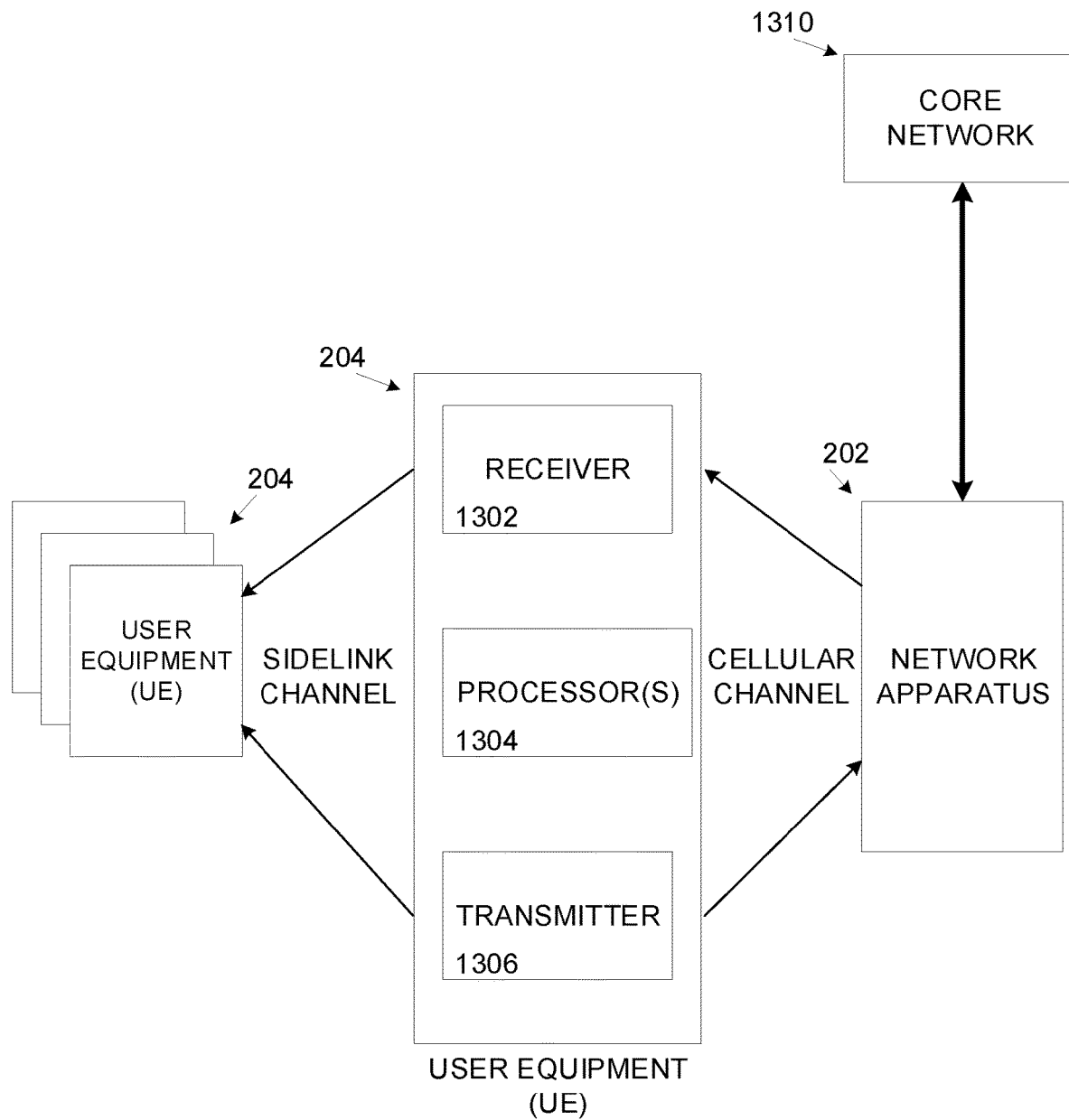
FIG. 13 is a schematic illustration of an exemplary UE, according to some embodiments of the present invention.

Reference is now made to FIG. 13, which is a schematic illustration of an exemplary UE, according to some embodiments of the present invention. A UE such as the UE 204, for example, the UE 204A, the UE 204B and/or the UE 204C may be adapted to execute a process such as the process 100 and/or the process 500 for assisting a handover of one or more other UEs between network infrastructure apparatuses such as the network apparatuses 202. The network infrastructure apparatuses 202 such as, for example, the source network apparatus 202A and the target network apparatus 202B are connected to a network core 1310.

The UE 204 comprises a receiver 1302 and a transmitter 1306 for communicating over a cellular channel with the source network apparatus 202A and/or the target network apparatus 202B and a processor(s) 1304 for controlling the process 100 and/or the process 500. The receiver 1302 and a transmitter 1306 also provide communication capabilities for communicating with one or more other UEs 204 over a sidelink channel that may be in-band and/or out-of-band with respect to the cellular channel.

The processor(s) 1304 may include one or more processors (homogenous or heterogeneous), which may be arranged for parallel processing, as clusters and/or as one or more multi core processing units. The processor(s) 1304 may execute program instructions from one or more storage devices, for example, a volatile memory, a non-volatile memory, a memory card and/or the like.

Figure 14:
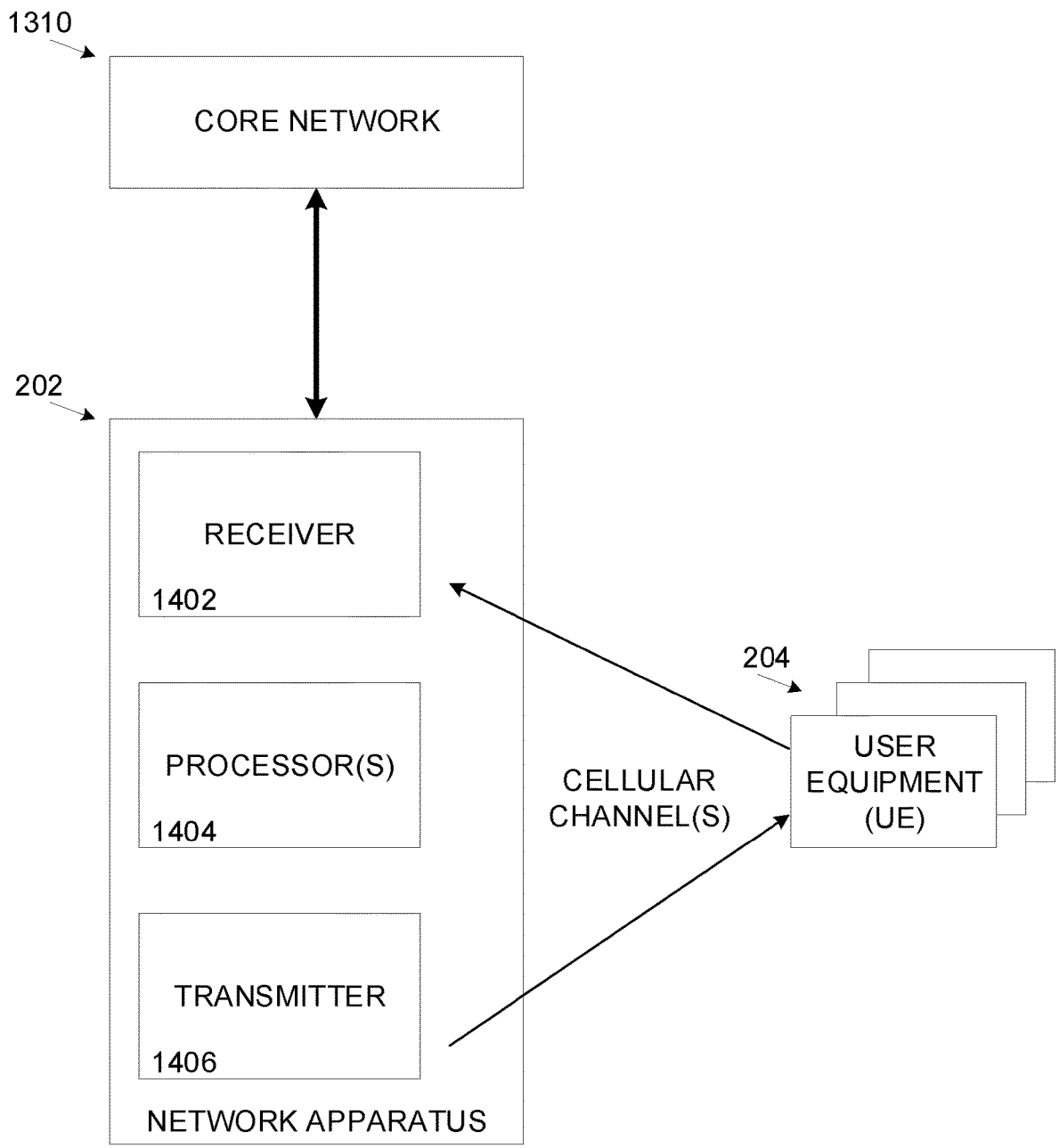
FIG. 14 is a schematic illustration of an exemplary network infrastructure apparatus, according to some embodiments of the present invention.

Reference is also made to FIG. 14, which is a schematic illustration of an exemplary network infrastructure apparatus, according to some embodiments of the present invention. A network apparatus such as the network apparatuses 202 executing the process 800 is connected to a network core such as the network core 1310. The network apparatuses 202, for example, the source network apparatus 202A and/or the target network apparatus 202B may provide connectivity to a cellular network for a plurality of UEs such as the UE 204. The network apparatuses 202 comprises a receiver 1402 and a transmitter 1406 for communicating over a cellular channel with the plurality of UEs 204 and a processor(s) 1404 for controlling a handover of one or more of the UEs 204 to another network apparatus 202. The processor(s) 1404 may include one or more processors (homogenous or heterogeneous), which may be arranged for parallel processing, as clusters and/or as one or more multi core processing units. The processor(s) 1404 may execute program instructions from one or more storage devices, for example, a volatile memory, a non-volatile memory, a hard drive and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant D2D connectivity interface will be developed and the scope of the term D2D connectivity interface respectively are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A first user equipment (UE), comprising:
a processor adapted to execute the following operations to assist a handover of a second UE from a source network apparatus to a target network apparatus of a cellular network:
maintain a sidelink connection between the first UE and the second UE;
maintain and/or establish a cellular connection between the first UE and the target network apparatus;
receive link state information from the second UE through the sidelink connection, wherein the link state information includes timing synchronization information for the second UE and information on a connectivity indication of the second UE with at least one of the source network apparatus or the target network apparatus, wherein the connectivity indication includes attach and detach information with respect to at least one of the source network apparatus or the target network apparatus;
report the link state information to the target network apparatus;
receive first control information from the target network apparatus, the first control information being based on the link state information; and
send second control information to the second UE through the sidelink connection, the second control information being based on the first control information, to assist the handover of the second UE to the target network apparatus, wherein the second control information includes timing synchronization information for the target network apparatus to synchronize a timing of the second UE to a timing of the target network apparatus prior to the handover of the second UE to the target network apparatus.

2. The first UE according to claim 1, wherein the processor is further adapted to configure the first UE to serve as a relay to provide an uplink and/or a downlink to the second UE through the sidelink connection while the second UE is detached from each of the source network apparatus and the target network apparatus of the cellular network.

3. The first UE according to claim 1, wherein, when the first UE is attached to the source network apparatus, the processor is further adapted to detach the first UE from the source network apparatus prior to attaching the first UE to the target network apparatus.

4. The first UE according to claim 1, wherein, when the second UE is attached to the source network apparatus, the processor is further adapted to maintain the sidelink connection between the first UE and the second UE while the second UE detaches from the source network apparatus, in order to attach the second UE to the target network apparatus.

5. The first UE according to claim 1, wherein the processor is further adapted to maintain the sidelink connection by disconnecting and reconnecting the sidelink connection between the first UE and the second UE using at least one of the first control information or the second control information.

6. The first UE according to claim 1, wherein the processor is further adapted to maintain the sidelink connection between the first UE and the second UE through a sidelink connection between the first UE and at least a third UE, wherein the at least third UE is configured to be connected to the second UE through the sidelink connection between the first UE and the at least third UE.

7. A second user equipment (UE), comprising:
a processor adapted to execute the following operations to assist a first UE to attach to a target network apparatus:
maintain a sidelink connection between the second UE and the first UE;
maintain and/or establish a cellular connection between the second UE and the source network apparatus;
receive link state information from the first UE through the sidelink connection, wherein the link state information includes timing synchronization information for the first UE and information on a connectivity indication of the first UE with at least one of the source network apparatus or the target network apparatus, wherein the connectivity indication includes attach and detach information with respect to at least one of the source network apparatus or the target network apparatus;
report the link state information to the source network apparatus;
receive first control information from the source network apparatus, the first control information being based on the link state information; and
send second control information to the first UE through the sidelink connection, the second control information being based on the first control information, to assist an attachment of the first UE to the target network apparatus, wherein the second control information includes timing synchronization information for the target network apparatus to synchronize a timing of the first UE to a timing of the target network apparatus prior to the attachment of the first UE to the target network apparatus.

8. The second UE according to claim 7, wherein the processor is further adapted to configure the second UE to serve as a relay to provide an uplink and/or a downlink to the first UE through the sidelink connection while the first UE is detached from each of the source network apparatus and the target network apparatus of the cellular network.

9. The second UE according to claim 7, wherein, when the first UE is attached to the source network apparatus, the processor is further adapted to detach the first UE from the source network apparatus, in order to attach the first UE to the target network apparatus.

10. The second UE according to claim 7, wherein the processor is further adapted to assist the attachment of the first UE to the target network apparatus after the first UE detaches from the source network apparatus.

11. The second UE according to claim 7, wherein the processor is further adapted to maintain the sidelink connection between the second UE and the first UE through a sidelink connection between the second UE and at least a third UE, wherein the at least third UE is configured to be connected to the first UE through the sidelink connection between the second UE and the at least third UE.

12. A network apparatus, comprising:
a processor adapted to:
provide a cellular service to an assisting user equipment (UE), wherein the assisting UE is attached to the network apparatus and connected through a sidelink connection to an assisted UE;
receive, from the assisting UE, link state information of the assisted UE, the link state information of the assisted UE being provided by the assisted UE to the assisting UE through the sidelink connection, wherein the link state information of the assisted UE includes timing synchronization information for the assisted UE and information on a connectivity indication of the assisted UE with the network apparatus, wherein the connectivity indication includes attach and detach information with respect to the network apparatus;

transmit first control information to the assisting UE, the first control information being based on the link state information of the assisted UE;

receive, from the assisted UE, an attach request for attaching to the network apparatus and second control information, the second control information being based on the first control information and provided by the assisting UE to the assisted UE through the sidelink connection, wherein the second control information includes timing synchronization information for the network apparatus to synchronize a timing of the assisted UE to a timing of the network apparatus prior to the attachment of the assisted UE to the network apparatus; and accept the attach request of the assisted UE to provide the cellular service to the assisted UE.

13. The network apparatus according to claim 12, wherein the assisted UE is attached to another network apparatus, and the processor is further adapted to negotiate with the other network apparatus a handover of the assisted UE in order to instruct the assisted UE to detach from the other network apparatus while maintaining the sidelink connection with the assisting UE.

\* \* \* \* \*